United States Patent
Hayashi et al.

(10) Patent No.: US 9,609,224 B2
(45) Date of Patent: Mar. 28, 2017

(54) IMAGING DEVICE AND IMAGE DISPLAY METHOD

(71) Applicant: FUJIFILM Corporation, Tokyo (JP)

(72) Inventors: Junji Hayashi, Saitama (JP); Katsutoshi Izawa, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 14/678,170

(22) Filed: Apr. 3, 2015

(65) Prior Publication Data

US 2015/0215545 A1 Jul. 30, 2015

Related U.S. Application Data

(63) Continuation of application No. PCT/JP2013/076050, filed on Sep. 26, 2013.

(30) Foreign Application Priority Data

Oct. 5, 2012 (JP) ................................. 2012-223336

(51) Int. Cl.
*H04N 5/232* (2006.01)
*G02B 7/28* (2006.01)
(Continued)

(52) U.S. Cl.
CPC ........... *H04N 5/23293* (2013.01); *G02B 7/28* (2013.01); *G02B 7/34* (2013.01); *G03B 17/18* (2013.01);
(Continued)

(58) Field of Classification Search
None
See application file for complete search history.

(56) References Cited

U.S. PATENT DOCUMENTS

2005/0174451 A1 8/2005 Nozaki et al.
2009/0153693 A1 6/2009 Onuki et al.
(Continued)

FOREIGN PATENT DOCUMENTS

JP 2005-223657 A 8/2005
JP 2005-229560 A 8/2005
(Continued)

OTHER PUBLICATIONS

International Preliminary Report on Patentability, issued in PCT/JP2013/076050 dated Apr. 9, 2015 with English translation.
(Continued)

*Primary Examiner* — Roberto Velez
*Assistant Examiner* — Yih-Sien Kao
(74) *Attorney, Agent, or Firm* — Birch, Stewart, Kolasch & Birch, LLP

(57) ABSTRACT

An imaging device includes a creation device configured to create a first display image, a second display image, and a third display image to be used for assisting the focusing confirmation from first and second images based on first and second image signals outputted from the first and second pixel groups, a display device, and a display control device, where the creation device creates the second display image including first and second display ranges in which the first image is used in the first display range and the second image is used in the second display range, and the creation device creates the third display image in which an image used in at least one of the first and second display ranges is different from the second display image.

15 Claims, 18 Drawing Sheets

(51) Int. Cl.
 *G02B 7/34* (2006.01)
 *H04N 5/369* (2011.01)
 *G03B 17/18* (2006.01)
 *G03B 13/36* (2006.01)

(52) U.S. Cl.
 CPC ..... *H04N 5/23212* (2013.01); *H04N 5/23296* (2013.01); *H04N 5/3696* (2013.01); *G03B 13/36* (2013.01)

(56) References Cited

U.S. PATENT DOCUMENTS

| | | |
|---|---|---|
| 2009/0153720 A1 | 6/2009 | Suzuki et al. |
| 2009/0237548 A1 | 9/2009 | Watanabe et al. |

FOREIGN PATENT DOCUMENTS

| | | |
|---|---|---|
| JP | 2007-324718 A | 12/2007 |
| JP | 2009-147665 A | 7/2009 |
| JP | 2009-163220 A | 7/2009 |
| JP | 2009-237214 A | 10/2009 |
| JP | 2009-290817 A | 12/2009 |

OTHER PUBLICATIONS

International Preliminary Report on Patentability (PCT/IPEA/409), issued in PCT/JP2013/076050, dated Mar. 11, 2014.
International Search Report, issued in PCT/JP2013/076050, dated Oct. 22, 2013.
Written Opininon of the International Searching Authority, issued in PCT/JP2013/076050, dated Oct. 22, 2013.

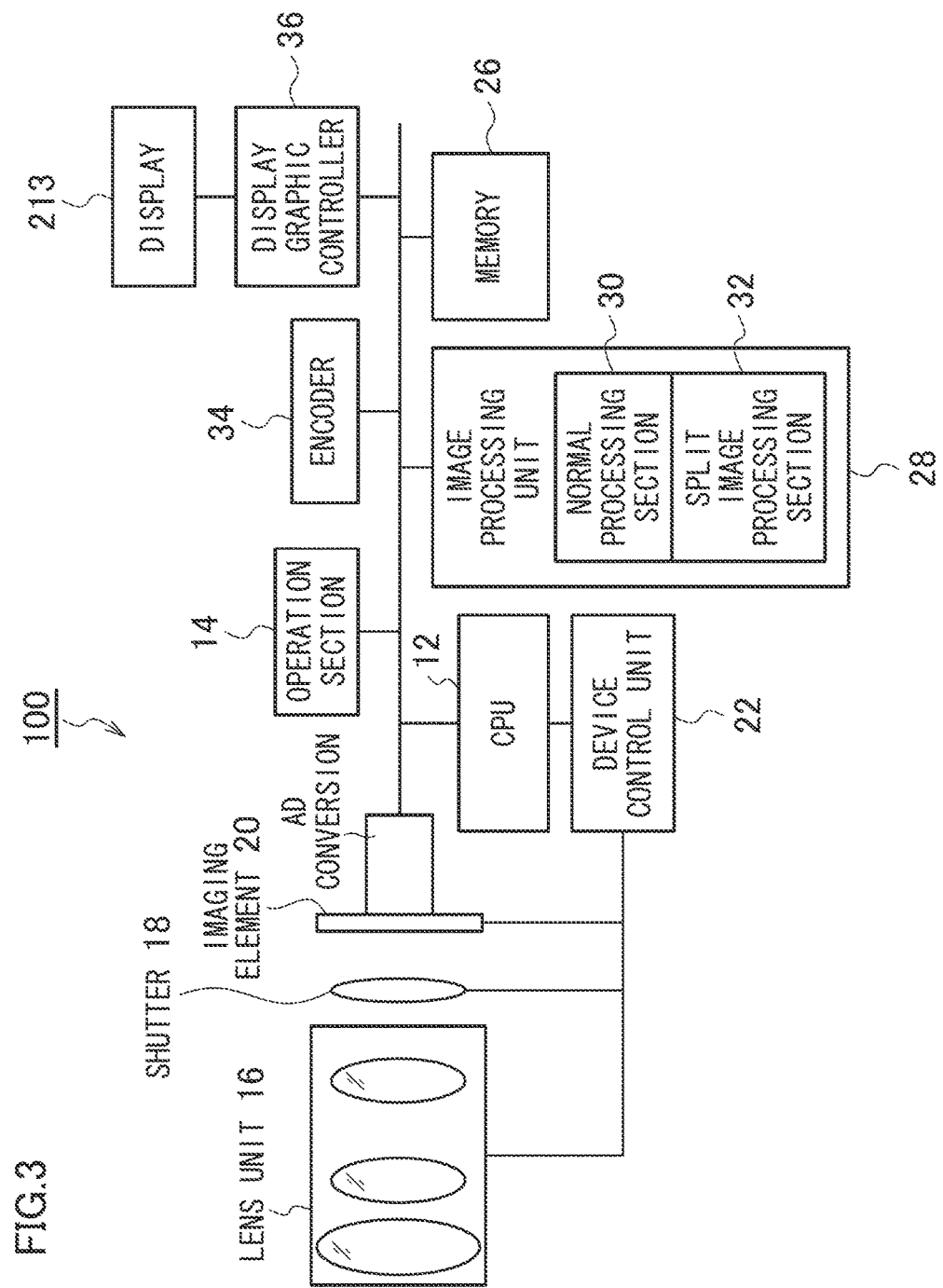

(SURFACE A)

(SURFACE B)

IMAGING DEVICE AND IMAGE DISPLAY METHOD

CROSS-REFERENCE TO RELATED APPLICATIONS

This application is a Continuation of PCT International Application No. PCT/JP2013/076050 filed on Sep. 26, 2013, which claims priority under 35 U.S.C §119(a) to Japanese Patent Application No. 2012-223336 filed on Oct. 5, 2012. Each of the above application(s) is hereby expressly incorporated by reference, in its entirety, into the present application.

BACKGROUND OF THE INVENTION

Field of the Invention

The present invention relates to an imaging device and an image display method, and more particularly to a technique of confirming focus.

Description of the Related Art

In a digital camera, an autofocus technique in which a phase difference detection method or a contrast detection method is used when focus is adjusted (focusing is performed) is known. On the other hand, a digital camera with a so-called a manual focus mode in which a user can manually adjust focus is also known.

A digital camera with the manual focus mode using a method in which contrast is visually checked by providing a reflex mirror so that focus can be adjusted while a photographed subject is checked is known.

Unfortunately, in the method in which contrast is visually checked, since the focus lens is moved back and forth around a focused point to find out a focused point, it is difficult to determine whether a subject is in focus in a state where the focus lens is not moved.

In a digital camera without a reflex mirror that has become wide spread in recent years, there is no method of checking a subject image while displaying phase difference because no reflex mirror is provided. As a result, focusing has to rely on the contrast detection method. In this case, however, it is impossible to display an image with contrast higher than that in resolution of a display device such as an LCD, so that a method of displaying the image by partially enlarging the image, or the like has to be used.

Thus, in recent years, a split image is displayed in a live view image (or called a through image) so that an operator can easily focus on a subject at the time of the manual focus mode. Here, the split image means that an image is split into top and bottom images each of which is displaced in a lateral direction when the subject is out of focus, corresponding to the amount of the out-of-focus, and each of which is not displaced in a lateral direction when the subject is in focus. A user operates a manual focus ring so that there is no displacement in the top and bottom images of the split image to focus on the subject (perform focusing).

Japanese Patent Application Laid-Open No. 2009-147665 (hereinafter referred to as PTL 1) describes an imaging device as an example of an imaging device that displays a split image. The imaging device creates a first image and a second image by applying photoelectric conversion to a first subject image and a second subject image, respectively, formed with pencils of light split by a pupil-split section in pencils of light from an imaging optical system, and creates the split image by using the first and second images as well as creates a third image by applying the photoelectric conversion to a third subject image formed with pencils of light that are not split by the pupil-split section. Then, the imaging device displays the third image in a display, as well as displays the split image created above in the third image, and also the imaging device is configured to add color information extracted from the third image to the split image.

On the other hand, unlike the split image, Japanese Patent Application Laid-Open No. 2005-229560 (hereinafter referred to as PTL 2) describes a stereoscopic image display method of alternately displaying right-eye images and left-eye images at high speed.

SUMMARY OF THE INVENTION

Unfortunately, in the technique described in PTL 1, while the split image is displayed, it is sometimes difficult to determine whether a desired subject is in focus. In addition, in the technique described in PTL 2, determination of whether a desired subject is in focus is not considered.

The present invention is made in light of the above-mentioned circumstances, and it is an object of the present invention to provide an imaging device and an image display method capable of easily determining whether an image displayed in a display is in focus.

In order to achieve the object above, an imaging device in accordance with one aspect of the present invention includes: a creation device that creates a first display image on the basis of an image signal outputted from an imaging element provided with first and second pixel groups in which subject images that have passed through first and second regions of a photographic lens are imaged, respectively, after pupil-split has been applied to the subject images, as well as creates a second display image to be used for focusing confirmation and a third display image to be used for assisting the focusing confirmation from first and second images based on first and second image signals outputted from the first and second pixel groups; a display device capable of alternately displaying the second display image and the third display image; and a display control device that controls alternate display of the second display image and the third display image in the display device, and that controls the display device so as to display the first display image and the second display image, or the first display image and the third display image.

Accordingly, since the second display image and the third display image are alternately displayed in the display device, it is possible to easily check whether an image of a desired subject is in focus.

In addition, an imaging device in accordance with another aspect of the present invention includes: a creation device that creates a second display image to be used for focusing confirmation and a third display image to be used for assisting the focusing confirmation from first and second images based on first and second image signals outputted from first and second pixel groups on the basis of image signals outputted from an imaging element provided with the first and second pixel groups in which subject images that have passed through first and second regions of a photographic lens are imaged, respectively, after pupil-split has been applied to the subject images; a display device capable of alternately displaying the second display image and the third display image; and a display control device that controls alternate display of the second display image and the third display image in the display device, and that controls the display device so as to display the second display image or the third display image.

Accordingly, since the second display image and the third display image are alternately displayed in a wide range in the display device, it is possible to easily check whether an image of a desired subject is in focus.

In the imaging device, it is preferable that the imaging element includes a third pixel group in which the subject image to which the pupil-split is not applied is imaged, and that the creation device creates the first display image on the basis of a third image signal outputted from the third pixel group. Accordingly, it is possible to acquire the first display image with better image quality.

In the imaging device, it is preferable that the imaging element includes first and second pixel groups in at least a central portion of the imaging element.

In the imaging device, it is preferable that the creation device creates the second display image including first and second display ranges in which the first image is used in the first display range and the second image is used in the second display range, and that the creation device creates the third display image in which an image used in at least one of the first and second display ranges is different from the second display image.

In the imaging device, it is preferable that the display control device switches between control in a first mode and control in a second mode, the first mode performing display in which an image composed of the first display image and the second display image, and an image composed of the first display image and the third display image, are alternately displayed, or the second display image and the third display image are alternately displayed, and the second mode performing display in which the image composed of the first display image and the second display image, or only the second display image, is displayed instead of the alternate display.

Accordingly, it is possible to switch display in the display device depending on use conditions, so that it is possible to comfortably view a display image in the display device at the time of photographing.

In the imaging device, it is preferable that the display control device switches between control in a first mode and control in a second mode, the first mode performing display in which the image composed of the first display image and the second display image, and the image composed of the first display image and the third display image, are alternately displayed, or the second display image and the third display image are alternately displayed at a first frequency, and the second mode performing display in which the image composed of the first display image and the second display image, and the image composed of the first display image and the third display image, are alternately displayed, or the second display image and the third display image are alternately displayed at a second frequency higher than the first frequency. Accordingly, it is possible to switch display in the display device depending on use conditions, so that it is possible to comfortably view a display image in the display device at the time of photographing.

In the imaging device, it is preferable that the display control device switches between control in a first mode and control in a second mode, the first mode performing display in which the image composed of the first display image and the second display image, and the image composed of the first display image and the third display image are alternately displayed, or the second display image and the third display image are alternately displayed, and the second mode performing display in which only the first display image is displayed. Accordingly, it is possible to switch display in the display depending on use conditions, so that it is possible to comfortably view a display image in the display at the time of photographing.

In the imaging device, it is preferable that the photographic lens has a manual focus function, and that the display control device performs control in the first mode while the manual focus function is used, and performs control in the second mode while the manual focus function is not used. Accordingly, it is possible to switch display in the display device depending on use conditions, so that it is possible to comfortably view a display image in the display device at the time of photographing.

In the imaging device, it is preferable that there is further provided a shutter device that outputs a photographing preparation command and a photographing command, and that the display control device switches to the first mode while the shutter device outputs the photographing preparation command. Accordingly, it is possible to switch display in the display depending on use conditions, so that it is possible to comfortably view a display image in the display device at the time of photographing.

In the imaging device, it is preferable that the photographic lens has a zoom function, and that the display control device performs control in the first mode while the zoom function is used and performs control in the second mode while the zoom function is not used. Accordingly, it is possible to switch display in the display device depending on use conditions, so that it is possible to comfortably view a display image in the display device at the time of photographing.

In order to achieve the object above, an image display method in accordance with one aspect of the present invention includes the steps of: creating a first display image on the basis of an image signal outputted from an imaging element provided with first and second pixel groups in which subject images that have passed through first and second regions of a photographic lens are imaged, respectively, after pupil-split has been applied to the subject images, as well as creating a second display image to be used for focusing confirmation and a third display image to be used for assisting the focusing confirmation from first and second images based on first and second image signals outputted from the first and second pixel groups; and allowing a display device capable of alternately displaying the second display image and the third display image to display the first display image and the second display image, or the first display image and the third display image by controlling alternate display of the second display image and the third display image in the display device.

Accordingly, since the second display image and the third display image are alternately displayed in the display device, it is possible to easily check whether an image of a desired subject is in focus.

In order to achieve the object above, an image display method in accordance with another aspect of the present invention includes the steps of: creating a second display image to be used for focusing confirmation and a third display image to be used for assisting the focusing confirmation from first and second images based on first and second image signals outputted from first and second pixel groups on the basis of image signals outputted from an imaging element provided with the first and second pixel groups in which subject images that have passed through first and second regions of a photographic lens are imaged, respectively, after pupil-split has been applied to the subject images; and allowing a display device capable of alternately displaying the second display image and the third display image to display the second display image or the third display image by controlling alternate display of the second display image and the third display image in the display device.

Accordingly, since the second display image and the third display image are alternately displayed in a wide range in the display device, it is possible to easily check whether an image of a desired subject is in focus.

According to the present invention, since the second display image and the third display image are alternately displayed, it is possible to easily check whether an image displayed in the display device is in focus.

BRIEF DESCRIPTION OF THE DRAWINGS

FIG. 3 is a block diagram showing an embodiment of the imaging device shown in FIG. 1.

DETAILED DESCRIPTION OF THE PREFERRED EMBODIMENTS

Hereinafter, the embodiments of the present invention will be described with reference to the accompanying drawings. In the following description, a phase difference pixel is indicated as a first pixel and a second pixel, and a normal pixel (a pixel that is not a phase difference pixel) is indicated as a third pixel. In addition, a first image signal is outputted from the first pixel to create a first image, and a second image signal is outputted from the second pixel to create a second image, and also a third image signal is outputted from the third pixel. A first display image (normal image or normal through image) is created from the first image and/or the second image. The first display image (normal image or normal through image) is also created from the third image signal. In addition, a second display image is created from the first image and the second image. A third display image for assisting focus confirmation is created from the first image and/or the second image.

(Appearance of Imaging Device)

Figure 1:
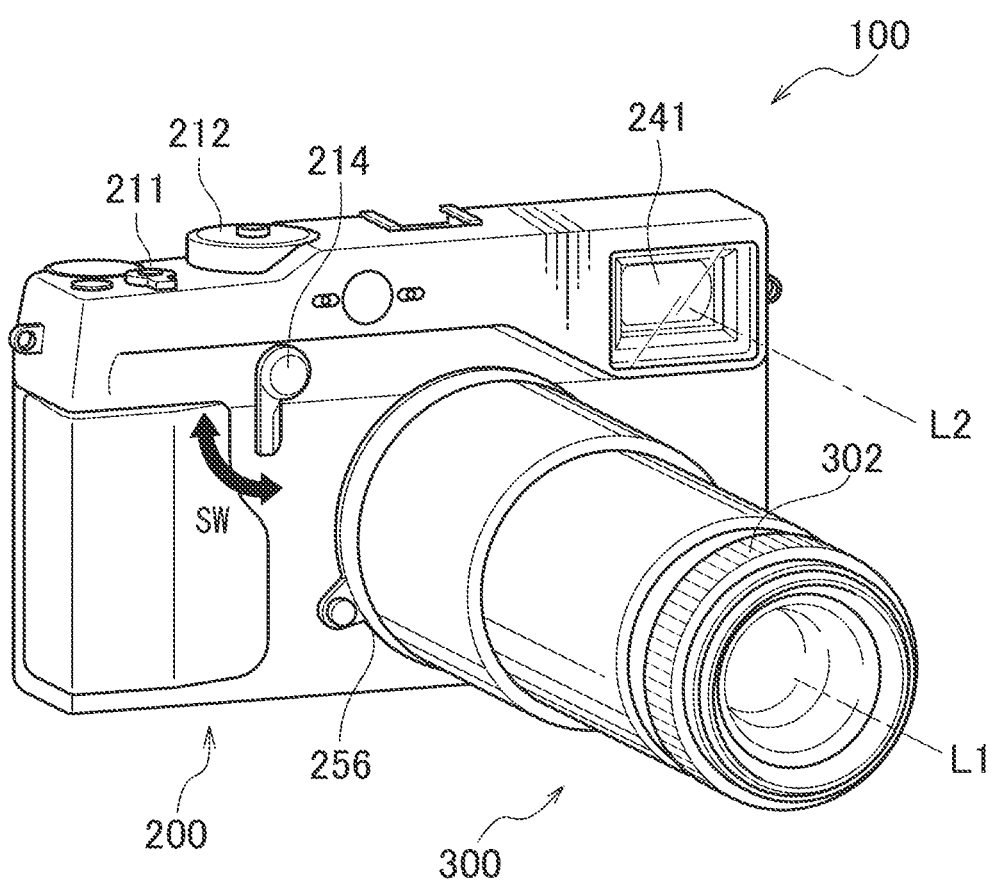
FIG. 1 is a perspective view of an imaging device in accordance with one aspect of the present invention as viewed from the oblique front.
Figure 2:
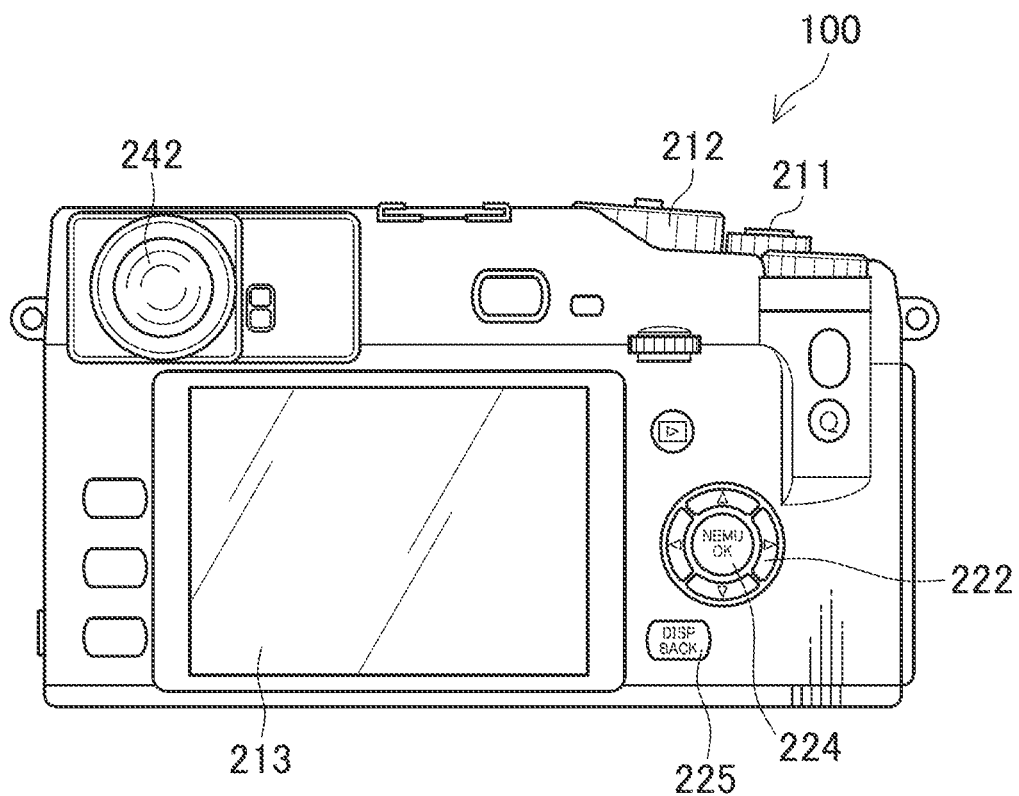
FIG. 2 is a rear view of the imaging device shown in FIG. 1.

FIG. 1 is a perspective view of an imaging device 100 of a camera provided with a zoom lens in accordance with one aspect of the present invention as viewed from the oblique front, and FIG. 2 is a rear view of the imaging device 100.

The imaging device 100 is a digital camera that includes a camera body 200, and a zoom lens 300 (a photographic lens (lens unit) 16 (a reference numeral is not shown) mounted to the camera body 200, and a focus ring 302 (manual operation section)), and that has no reflex mirror.

The camera body 200 is provided in its front face with a finder window 241 of an optical view finder, a finder change lever (finder change section) 214, and the like. When the finder change lever 214 is turned in an arrow direction SW, a visible image is changed between an optical image and an electronic image (live view image) (described later) in the optical view finder. The optical view finder has an optical axis L2 that is different from an optical axis L1 of the zoom lens 300. In addition, the camera body 200 is provided in its top face mainly with a shutter button 211 (release button) and a dial 212 for setting a photographing mode and the like.

The camera body 200 is provided in its back face mainly with a finder eyepiece section 242 of the optical view finder, a display 213, a cross key 222, a MENU/OK key 224, and a BACK/DISP button 225. If the shutter button 211 is pressed halfway down, a signal of a photographing preparation command is transmitted to a central processing unit (CPU) 12 from an operation section 14 (refer to FIG. 3). In addition, if the shutter button 211 is pressed all the way down, a signal of a photographing command is transmitted to the CPU 12 from the operation section 14 (refer to FIG. 3).

The cross key 222 serves as a multiple function key that selects a menu, and that outputs various command signals for zooming, frame advance, and the like. The MENU/OK key 224 is an operation key that serves as not only a menu button for giving a command to display a menu in a screen of the display 213, but also an OK button for giving a command to determine and perform a selected content. The BACK/DISP button 225 is used to delete a desired object such as a selected item and to cancel content of a command, or to return to the previous operation state.

The display 213 is used to display a live view image (through image) at the time of the photographing mode, and to display a reproduction image at the time of a reproduction mode, as well as is used to display a menu screen and the like. Although there is described the display 213 in the following description, the display in the imaging device of the present invention includes a finder shown in FIG. 2 (the finder exists at a portion where the finder eyepiece section 242 of FIG. 2 is attached), and the display 213 (a liquid crystal screen display). In addition, the finder change lever 214 may have a function to change image display in the finder and the display 213, or the dial 212 may have the function.

Although FIG. 1 shows the imaging device 100 provided with a zoom lens, the imaging device 100 of the present invention is not limited to the imaging device 100 provided with a zoom lens. That is, the imaging device 100 provided with a single focus lens may be also used as the imaging device 100 of the present invention. In addition, the imaging device 100 of the present invention may include the imaging device 100 with an interchangeable lens.

(Inner Structure of Imaging Device)

FIG. 3 is a block diagram showing an embodiment of the imaging device 100 in accordance with the present invention.

The imaging device 100 is a digital camera that records a still picture and a moving image that are photographed, and operation of the whole of the camera is integrally controlled by the central processing unit (CPU) 12.

As shown in FIGS. 1 and 2, the operation section 14 of the imaging device 100 includes the shutter button 211, the dial (focus mode change section) 212 that is used to select a photographing mode and the like, the finder change lever 214, the cross key 222, the MENU/OK key 224, and the BACK/DISP button 225. Various operation signals from the operation section 14 are to be transmitted to the CPU 12.

When a photographing mode is set, image light showing a subject is imaged in a receiving surface of an color imaging element (complementary metal oxide semiconductor (CMOS) sensor) 20 through the photographic lens 16 including a focus lens that is movable by manual operation, and the shutter 18. Signal charge accumulated in an imaging element 20 is sequentially read out as a digital signal corresponding to the signal charge (voltage) by using a read-out signal transmitted from a device control unit 22. In addition, the imaging element 20 has so-called an electronic shutter function of controlling electric charge accumulation time (shutter speed) of each of photo sensors by using timing of the read-out signal.

In the imaging element 20 configured as above, the first image signal and the second image signal are read out from a first pixel group and a second pixel group, respectively, and an AD converter applies AD conversion to the image signals, and then the image signals are temporarily stored in a memory 26 such as a synchronous dynamic random access memory (SDRAM). The imaging element 20 used in the present invention may also include the first pixel group, the second pixel group, and the third pixel group. If the imaging element 20 includes the third pixel group, the first image signal, the second image signal, and the third image signal, are read out from the first pixel group, the second pixel group, and third pixel group, of the imaging element 20, respectively, and the image signals are temporarily stored in the memory 26 such as the SDRAM.

As shown in FIG. 3, an image processing unit 28 includes a normal processing section 30, and a split image processing section 32. The normal processing section 30 processes the third image signal (R, G, and B signals) corresponding to the third pixel group provided in the imaging element 20 to create the first display image. On the other hand, the split image processing section 32 processes a first pixel signal and a second pixel signal (R, G, and B signals) corresponding to the first pixel group and the second pixel group, respectively, to create the second display image and the third display image.

If the imaging element 20 includes the first pixel group, the second pixel group, and the third pixel group, it is possible to select any of the image signals to create the first display image. That is, the first display image may be created on the basis of not only the first pixel group and the second pixel group, but also the third pixel group.

Each of the normal processing section 30 and the split image processing section 32 includes: a WB gain section (not shown) that adjusts a gain of each of R, G, B signals to perform white balance (WB) correction; a gamma correction section (not shown) that applies gamma correction to each of the R, G, and B signals to which the WB correction is applied; a demosaic (synchronization) processing section (not shown) that performs a demosaic (color interpolation) processing corresponding to color filter array of the imaging element 20 to create the R, G, and B signals to which the demosaic processing is applied (synchronized); and the like. Each of the processing sections above sequentially applies the signal processing to original digital signals (RAW data) temporarily stored in the memory 26.

Here, the demosaic processing (demosaicing processing) is processing in which all color information is calculated for each pixel from a mosaic image corresponding to a color filter array of a single plate type color imaging element, and is also called synchronization processing. In a case of an imaging element composed of color filters of three colors of RGB, for example, in the demosaic processing, all color information on RGB colors for each pixel is calculated from a mosaic image composed of three colors of RGB.

Figure 11:
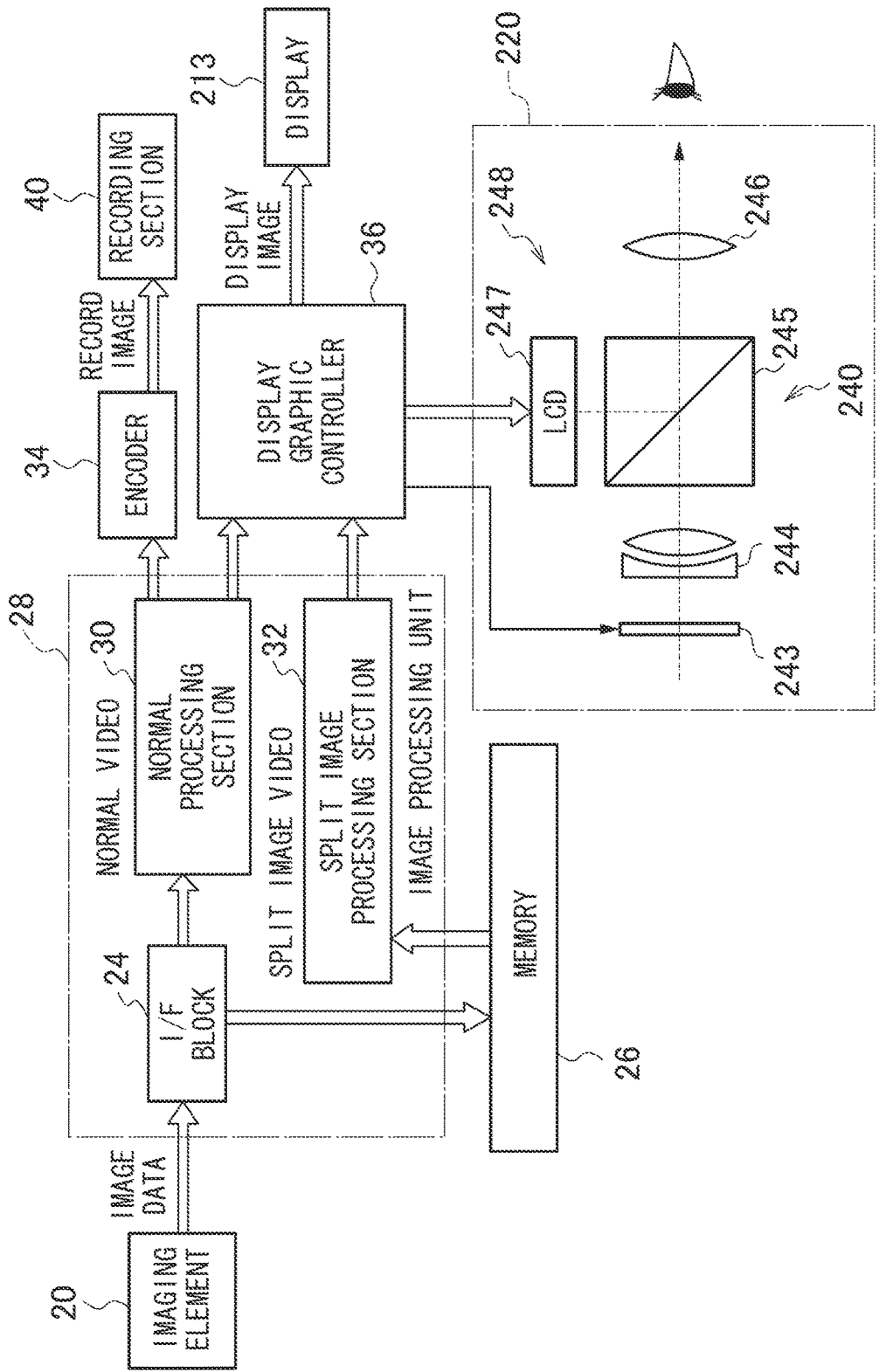
FIG. 11 is a functional block diagram showing a main section of the imaging device of the present invention.

R, G, and B signals processed by the normal processing section 30 are encoded to recording signals by an encoder 34 to be recorded in a recording section 40 (refer to FIG. 11).

Each of a display color image (first display image) processed by the normal processing section 30 and a display color image (second and third display images) processed by the split image processing section 32 is supplied to a display graphic controller 36 (display control unit). The display graphic controller 36 combines the color second and third display images in a display area of the first display image received, and outputs combined image data to the display 213.

The first display image (a normal color image) may be combined with the second and third display images by a method of not only inserting the second and third display image instead of a part of the first display image, but also superimposing the second and third display images on the first display image. In addition, when the second and third display images are superimposed, transmittance of a part of the first display image on which the second and third display image are superimposed, and of the second and third display image, may be appropriately adjusted for superimposition.

Figure 10:
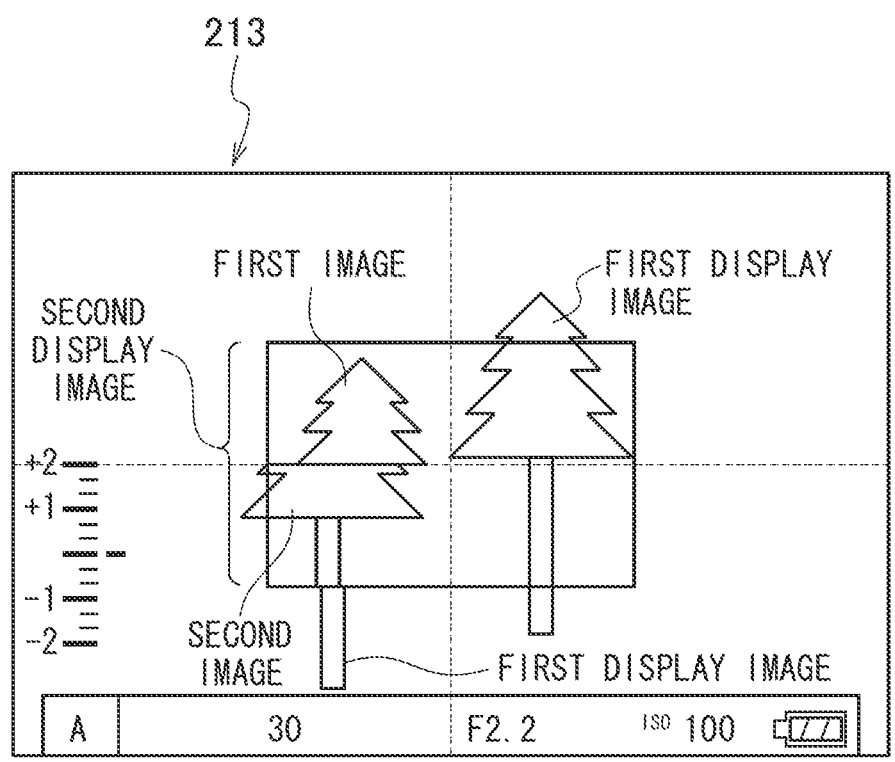
FIG. 10 shows a display example of the first display image and the second display image.

In this way, a live view image showing a photographing subject image is continuously displayed in a screen of the display 213, and the live view image is displayed so that the second and third display images are displayed in a display area of the first display image (refer to FIG. 10).

In addition, the second and third display images may be displayed in a part of the display 213. In this case, the first display image is not displayed in the display 213, and the second and third display images are displayed in the display 213.

The imaging device 100 is configured so that a manual focus mode and an autofocus mode are selectable by using the dial 212 (focus mode change section). When the manual focus mode is selected, it is preferable to display a live view image in which the second and third display images are combined in the display 213.

On the other hand, when the autofocus mode is selected by using the dial 212, the CPU 12 serves as a phase difference detection section and an automatic focus adjustment section. The phase difference detection section detects phase difference between the first image of the first pixel group serving as a phase difference pixel and the second image of the second pixel group. The automatic focus adjustment section allows the device control unit 22 to control a lens driving section (not shown) via mounts 256 and 346 to move the photographic lens 16 to an in-focus position on the basis of detected phase difference so that the amount of defocus (a phase shift between the first and second images) of the photographic lens 16 becomes zero.

(Imaging Element)

Next, a configuration of the imaging element 20 shown in FIGS. 4A to 4C will be described.

Figure 4A:
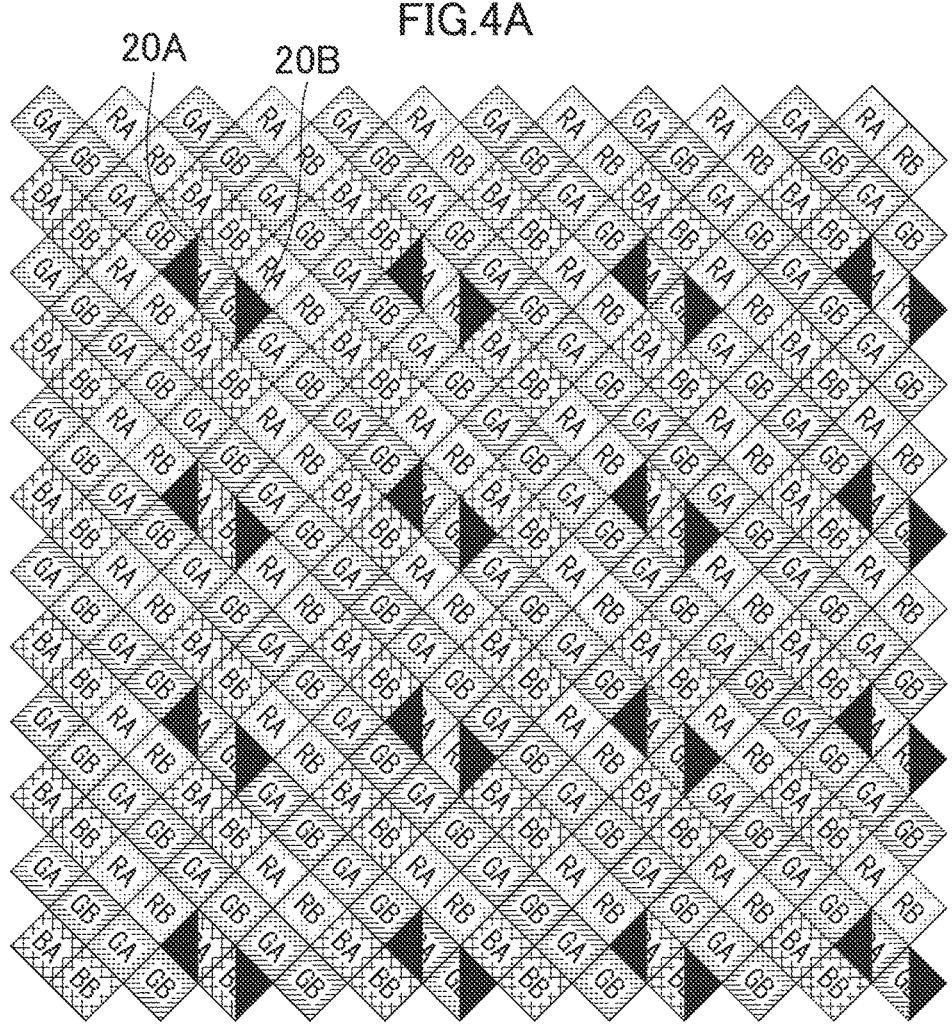
FIG. 4A shows a color filter array of color filters and light-shielding members provided in an imaging element used in the imaging device of the present invention.
Figure 4B:
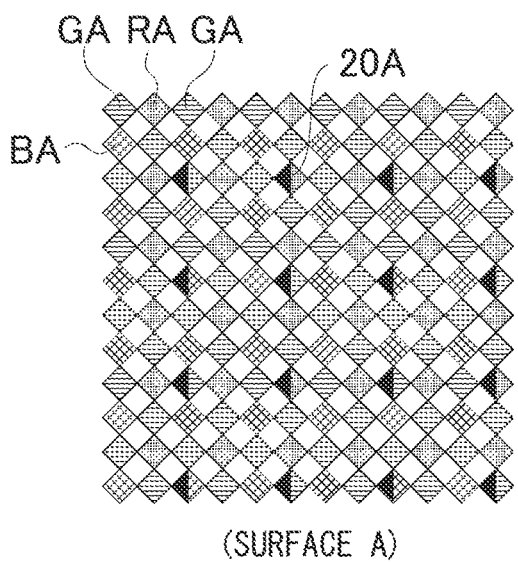
FIG. 4B shows a surface A of a color filter array of color filters and light-shielding members provided in an imaging element used in the imaging device of the present invention.
Figure 4C:
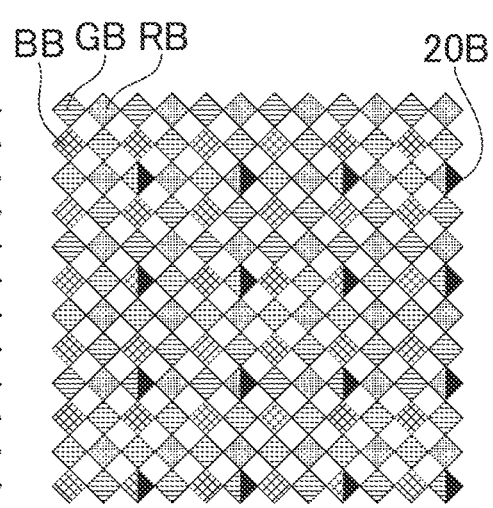
FIG. 4C shows a surface B of a color filter array of color filters and light-shielding members provided in an imaging element used in the imaging device of the present invention.

FIGS. 4A to 4C shows a color filter array and light-shielding members of color filters provided in the imaging element 20. RA, GA, and BA shown in FIG. 4A indicate color filters of R (red), G (green), and B (blue) provided in the surface A shown in FIG. 4B, respectively. In addition, RB, GB, and BB shown in FIG. 4A indicate color filters of R (red), G (green), and B (blue) provided in the surface B shown in FIG. 4C, respectively. Further, a pixel including the light-shielding member indicated as 20A or 20B in a color filter is a phase difference pixel.

As shown in FIG. 4A, the imaging element 20 includes color filters of red (R), green (G), and blue (B) arranged on respective pixels that are arranged so that a pixel group of a Bayer array provided in the surface A and a pixel group provided in the surface B are mutually displaced in each of a horizontal direction and a vertical direction by a half-pitch (refer to FIGS. 4B and 4C).

The imaging element 20 of the present invention includes the first and second pixel groups (refer to FIGS. 5A and 5B) in which subject images that have passed through first and second regions of the photographic lens 16 are imaged, respectively, after pupil-split has been applied to the subject images. There are the first and second pixel groups in the imaging element 20, so that it is possible to acquire the first pixel signal from the first pixel group, and the second pixel signal from the second pixel group. Accordingly, the second display image can be created from the first pixel signal and/or the second pixel signal. In addition, the third display image can be created from the first pixel signal and/or the second pixel signal.

Further, the first display image also can be created by using the first pixel signal and the second pixel signal.

On the other hand, the imaging element 20 may include the third pixel group in which the subject image above to which pupil-split has not been applied is imaged. If the imaging element 20 includes the third pixel group, the first display image can be created from not only the first and second image signals but also the third image signal. In a case where the first display image is created from the third image signal, the first display image has better image quality.

Each of a pixel group in the surface A and a pixel group in the surface B is composed of a normal pixel group (the third pixel group) and a phase difference pixel group (the first pixel group and the second pixel group) for detecting phase difference.

Figure 5A:
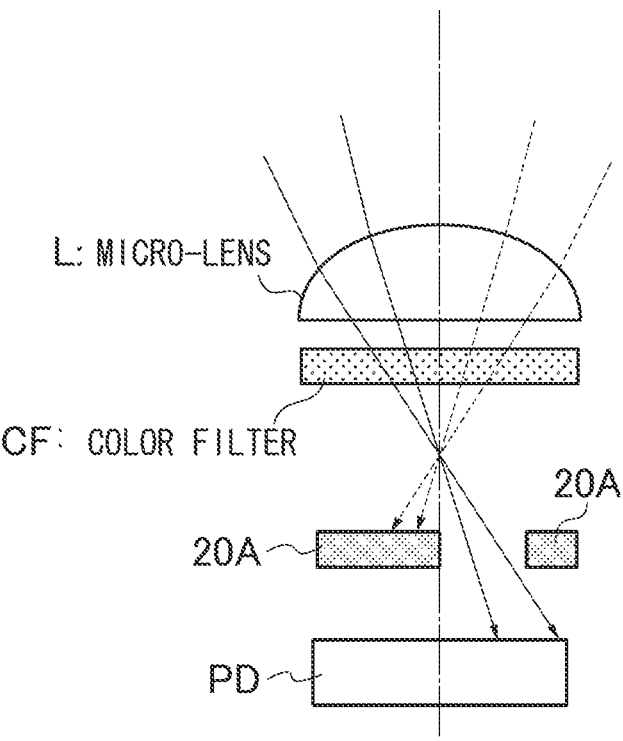
FIG. 5A shows a structural example of a first pixel serving as a phase difference pixel.
Figure 5B:
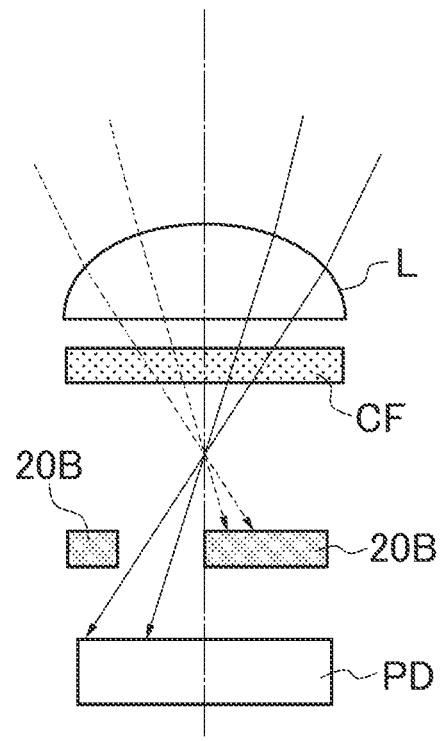
FIG. 5B shows a structural example of a second pixel serving as a phase difference pixel.

Each of FIGS. 5A and 5B shows an example of the phase difference pixel constituting the first pixel group and the second pixel group of the imaging element 20.

The first pixel shown in FIG. 5A includes a light-shielding member 20A that is arranged on a front surface side (micro-lens L side) of a photodiode PD so as to block light from reaching a left half of a receiving surface of the photodiode PD. On the other hand, the second pixel shown in FIG. 5B includes a light-shielding member 20B that is arranged on the front surface side of the photodiode PD so as to block light from reaching a right half of the receiving surface of the photodiode PD. For convenience of description, although the pixel shown in FIG. 5A is indicated as the first pixel and the pixel shown in FIG. 5B is indicated as the second pixel, the pixel shown in FIG. 5A may be indicated as the second pixel and the pixel shown in FIG. 5B may be indicated as the first pixel.

The micro-lens L and the light-shielding members 20A and 20B serve as a pupil-split section. The first pixel receives light only on a left side with respect to an optical axis of pencils of light that passes through an exit pupil of the photographic lens 16, and the second pixel receives light only on a right side with respect to the optical axis of the pencils of light passing through the exit pupil of the photographic lens 16. In this way, the pencils of light passing through the exit pupil are split into right and left sides by the micro-lens L and the light-shielding members 20A and 20B, serving as the pupil-split section, to be incident on the first pixel and the second pixel (phase difference pixel), respectively.

Although an in-focus portion in each of a subject image corresponding to a left half of the pencils of light passing through the exit pupil of the photographic lens 16 and a subject image corresponding to a right half thereof is imaged at the same position in the imaging element 20, a portion in front focus or in back focus in each thereof is imaged at a different position in the imaging element 20 (phase is shifted). In this way, a subject image corresponding to the left half of the pencils of light and a subject image corresponding to the right half of the pencils of light can be acquired as parallax images (a left-eye image and a right-eye image) each of which has a different parallax. Although the imaging element 20 of the present embodiment is an image sensor of a CMOS type, the imaging element 20 is not limited to the above, and a charge coupled device (CCD) image sensor may be available.

It is preferable that the first pixel group and the second pixel group are arranged in a central portion of the imaging element 20. Because an image required to be in focus is positioned in a central portion of a field angle in many cases, it is easy to focus on the image if the first pixel group and the second pixel group are positioned in the central portion of the imaging element 20. Here, the central portion means a given region including the center point of the imaging element 20.

Figure 6:
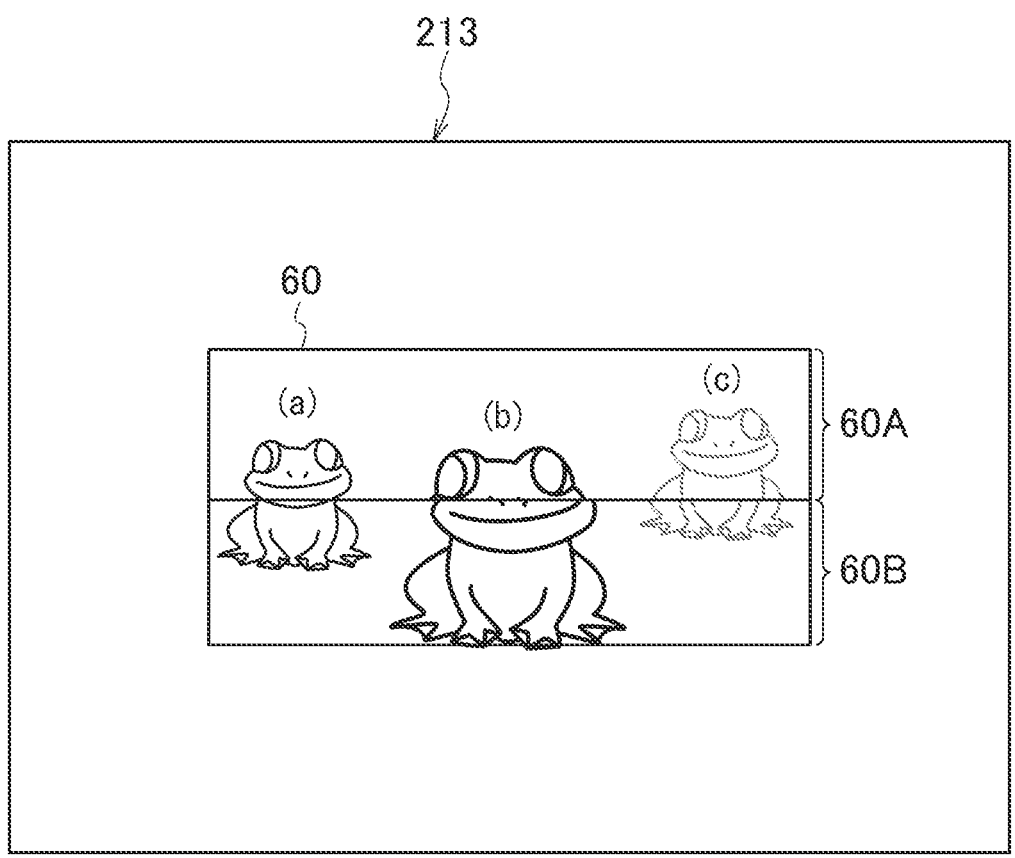
FIG. 6 shows an example of the second display image.

FIG. 6 shows an example of the second display image 60 created from the first image and second image. The second display image 60 includes a first display range 60A and a second display range 60B. The first image is displayed in the first display range 60A, and the second image is displayed in the second display range 60B. That is, the second display image 60 is created as so-called a split image.

The first and second pixel groups are provided so as to correspond to a size of the second display image 60. The split image is composed of an image (parallax image) in the first display range 60A of the second display image 60, created on the basis of the first pixel group, and an image (parallax image) in the second display range 60B of the second display image 60, created on the basis of the second pixel group.

In the second display image 60 shown in FIG. 6, there are subjects (a), (b), and (c) each of which has a different focal length. In the example shown in FIG. 6, the subject (a) is in focus, and the subjects (b) and (c) are out of focus. That is, the subject (a) has no displacement of an image in a parallax direction (horizontal direction) at a boundary between the first display range 60A and the second display range 60B. On the other hand, each of the subject (b) and the subject (c) has displacement of an image in the parallax direction (horizontal direction) at the boundary between the first display range 60A and the second display range 60B. Thus, in the second display image 60 shown in FIG. 6, the subject (a) is in focus.

Figure 7:
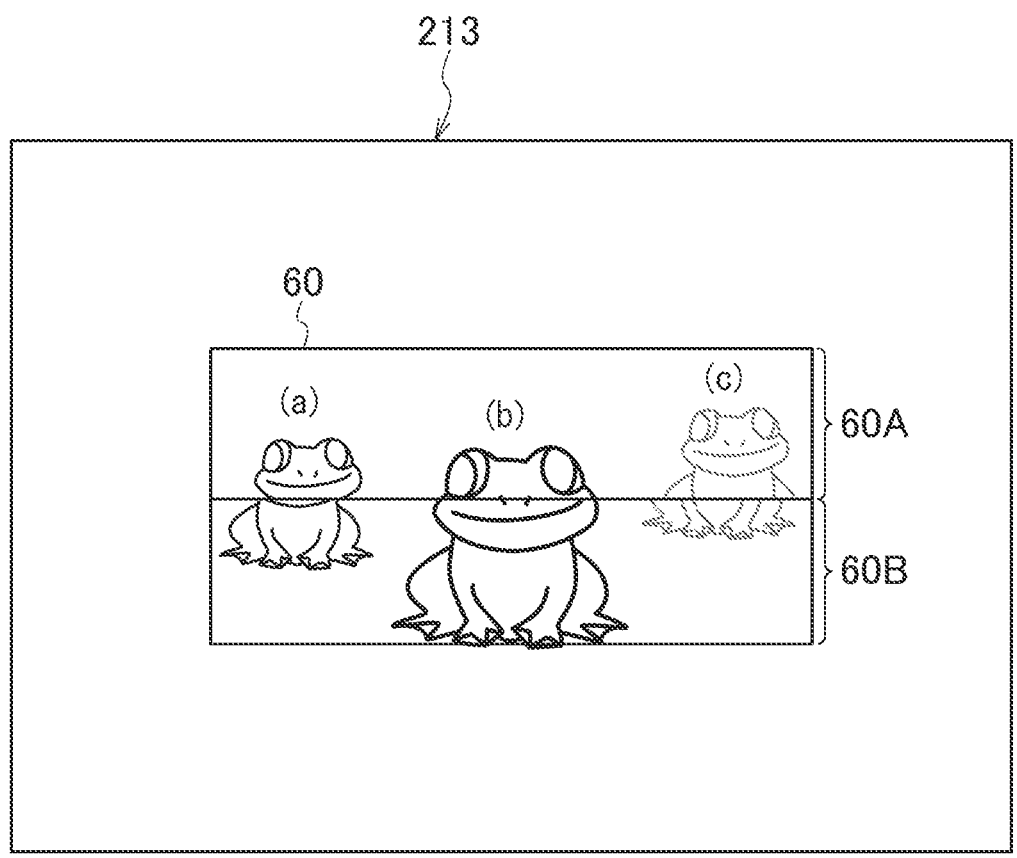
FIG. 7 shows another example of the second display image.

As with FIG. 6, FIG. 7 shows an example of the second display image 60 created from the first image and second image. In the second display image 60, there are subjects (a), (b), and (c) each of which has a different focal length.

In a case of FIG. 7, the subject (b) is in focus. That is, each of the subject (a) and the subject (c) has displacement of an image in the parallax direction (horizontal direction) at a boundary between the first display range 60A and the second display range 60B. On the other hand, the subject (b) has no displacement of an image in the parallax direction (horizontal direction) at the boundary between the first display range 60A and the second display range 60B. Thus, in the second display image 60 shown in FIG. 7, the subject (b) is in focus.

The third display image has a first display range and a second display range as with the second display image 60 shown in FIGS. 6 and 7. In addition, the third display image has an image used in at least one of the first display range and the second display range, the image being different from that used in the second display image 60 (refer to a reference numeral 61 shown in FIGS. 8A and 9A).

For example, in the second display image 60, the first image is displayed in the first display range 60A and the second image is displayed in the second display range 60B. Thus, it is deemed that the third display image includes the following cases: where the first image is used in the first display range and the second display range; where the second image is used in the first display range and the second display range; and where the second image is used in the first display range, and the first image is used in the second display range.

Figure 8A:
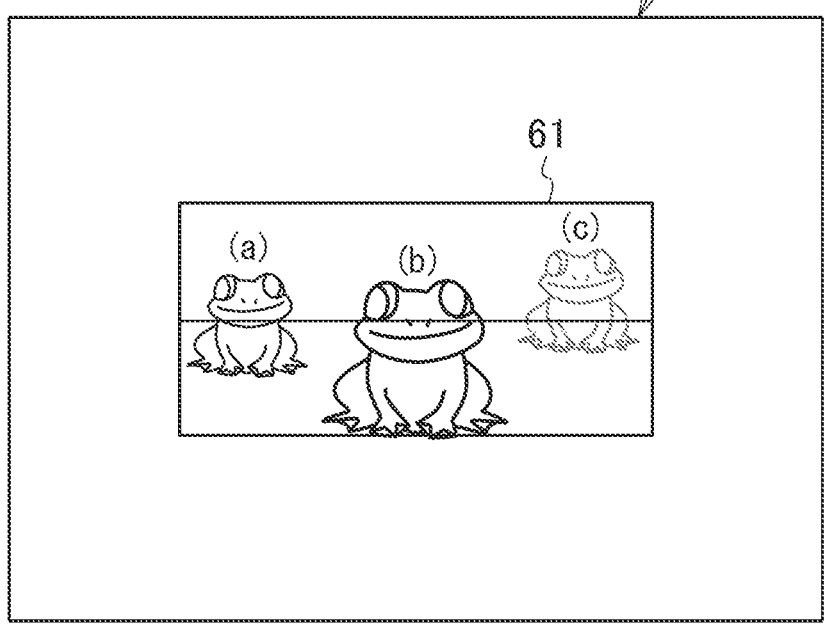
FIG. 8A shows an example of alternate display of the second display image and the third display image.
Figure 8B:
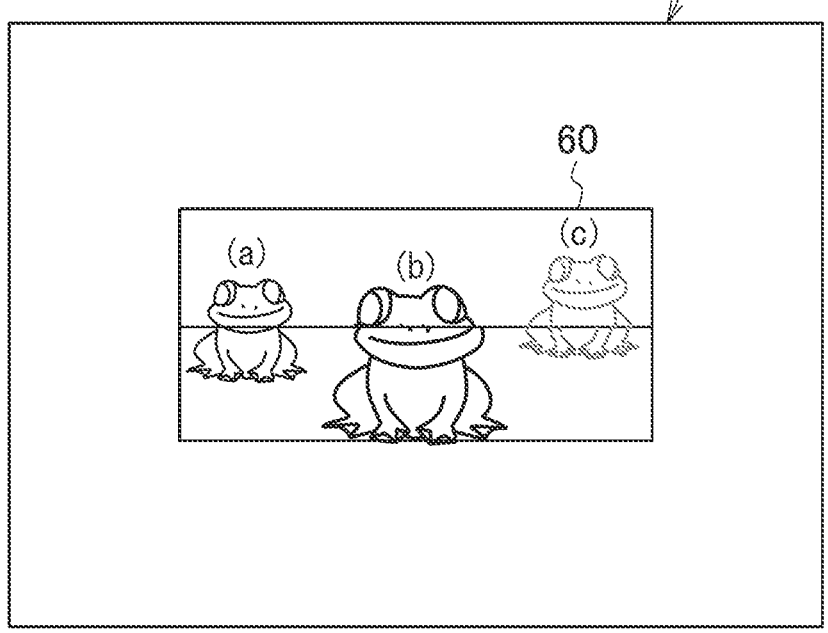
FIG. 8B shows an example of alternate display of the second display image and the third display image.

Each of FIGS. 8A, 8B, 9A, and 9B shows an example of alternate display of the second display image 60 and the third display image. FIG. 8A shows the third display image 61 in which the second image is used in the first display range and the second display range. On the other hand, FIG. 8B shows the second display image 60 shown in FIG. 6.

Figure 9A:
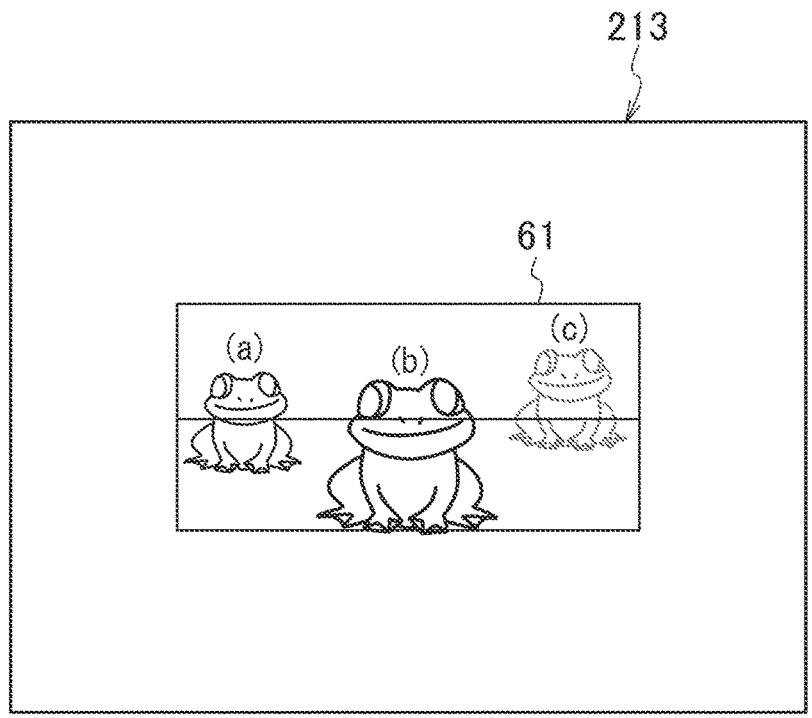
FIG. 9A shows another example of alternate display of the second display image and the third display image.

In addition, FIG. 9A shows the third display image 61 in which the second image is used in the first display range and the second display range. On the other hand, FIG. 9B shows the second display image 60 shown in FIG. 7.

Figure 9B:
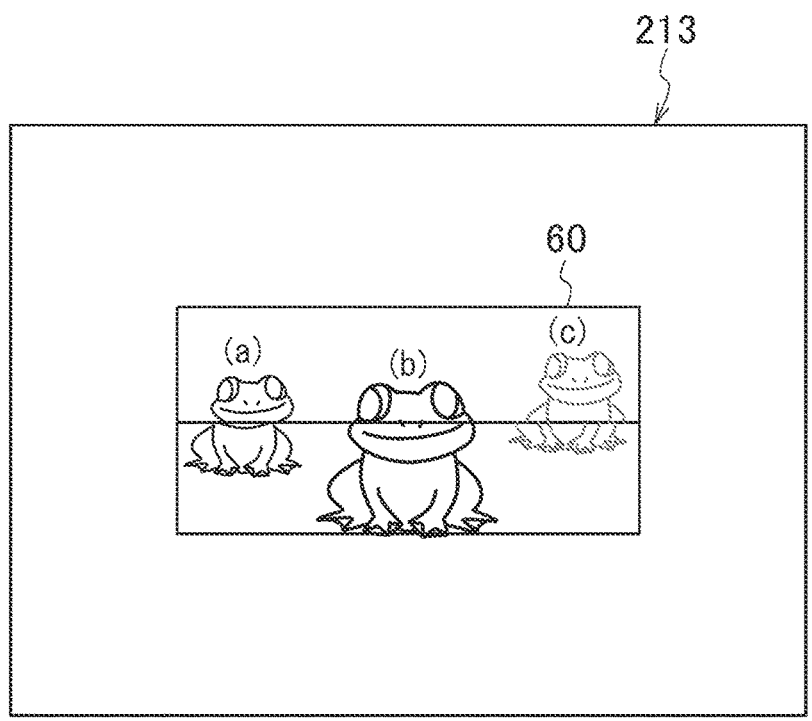
FIG. 9B shows another example of alternate display of the second display image and the third display image.

As shown in FIGS. 8A, 8B, 9A, and 9B, the alternate display means that the third display image 61 shown in FIG. 8A and the second display image 60 shown in FIG. 8B, or the third display image 61 shown in FIG. 9A and the second display image 60 shown in FIG. 9B, are alternately displayed at a predetermined frequency.

In this way, the second display image 60 and the third display image 61 are alternately displayed, so that it is possible to easily find out which portion of an image currently displayed is focused on (in focus). That is, in a case where the image shown in FIG. 8A (third display image 61) and the image shown in FIG. 8B (second display image 60) are alternately displayed, an image of an in-focus subject (the subject (a) in each of FIGS. 8A and 8B) is not changed (is not displaced) even if the alternate display is performed. On the other hand, an image of an out-of-focus subject (the subjects (b) and (c) in FIGS. 8A and 8B) is changed (displaced) by performing the alternate display. Thus, it is possible to easily find out which portion of an image currently displayed is focused on (in focus) by alternately displaying the second display image 60 and the third display image 61.

FIG. 10 shows an example of an image displayed in the display 213 or a finder (the finder is provided at the same position as that of the finder eyepiece section 242 shown in FIG. 2). In the example shown in FIG. 10, the display 213 or the finder displays the first display image as well as the second display image 60 (the second display image 60 is composed of the first image and the second image). In addition, in the example shown in FIG. 10, although the third display image 61 is not shown, the second display image 60 or the third display image 61 is displayed in a case where the second display image 60 and the third display image 61 are alternately displayed. That is, it is possible to display the first display image and the second display image 60, or the first display image and the third display image 61 in the display 213 or the finder.

There is a variety of forms applicable to display the first display image, the second display image, and the third display image in the display 213. For example, the display may include a first mode and a second mode, and the first mode and the second mode may be selectable.

In the first mode, the first display image and the second display image 60, the first display image and the third display image 61, or the second display image 60 and the third display image 61, may be alternately displayed.

In addition, in the first mode, the first display image and the second display image 60, the first display image and the third display image 61, or the second display image 60 and the third display image 61, may be alternately displayed at a first frequency, and in the second mode, the first display image and the second display image 60, the first display image and the third display image 61, or the second display image 60 and the third display image 61, may be alternately displayed at a second frequency (the second frequency is higher than the first frequency). From a viewpoint of determining whether an image is in focus, each of the first frequency and the second frequency is within a range from 0.5 Hz to 20 Hz, preferably within a range from 1 Hz to 18 Hz, and more preferably within a range from 2 Hz to 16 Hz.

Further, in the first mode, the first display image and the second display image 60, the first display image and the third display image 61, or the second display image 60 and the third display image 61, may be alternately displayed, and in the second mode, the first display image may be displayed all over the display.

FIG. 11 is a functional block diagram showing a main section of the imaging device 100. A component in FIG. 11 common to that in the block diagram shown in FIG. 3 is designated by the same reference numeral as that in FIG. 3.

In FIG. 11, the normal processing section 30 receives RAW data (RAW image) on R, G, and B outputted from an interface (I/F) block (section) 24, and creates a RAW image so that pixels of R, G, and B, positioned in the first and second pixel groups are interpolated by periphery pixels in the same color in the third pixel group. Accordingly, it is possible to acquire the RAW image of the third pixel group for one screen as with the imaging element 20 including only the third pixel group, so that a recording first display image can be created on the basis of the RAW image of the third pixel group.

The normal processing section 30 outputs image data on the recording first display image created to the encoder 34 and the display graphic controller 36.

Meanwhile, the split image processing section (split image processing block) 32 extracts R, G, and B signals of the first pixel group and the second pixel group from the RAW data temporarily stored in the memory 26 to create the second display image 60 and the third display image 61 on the basis of the R, G, and B signals of the first pixel group and the second pixel group.

The split image processing section 32 is capable of creating right and left parallax images (the first image and the second image) by performing image processing including demosaic (synchronization) processing equivalent to that performed by the normal processing section 30, and the like, on the basis of the R, G, and B signals of the first pixel group and second pixel group. Then the split image processing section 32 creates a split image by combining the image in the first display range 60A of the second display image 60, shown in FIGS. 6 and 7, and the image in the second display range 60B of the second display image 60, shown in FIGS. 6 and 7, and outputs image data on the split image created to the display graphic controller 36.

In addition, the split image processing section 32 creates the third display image 61, and outputs the third display image 61 to the display graphic controller 36. The display graphic controller 36 creates the third display image 61 from the first image and the second image described above, the third display image 61 being formed so that an image used in at least one of the first display range and the second display range of the third display image 61 is different from that used in the second display image 60 described above.

Since the first pixel group and the second pixel group are configured so as to block light from reaching a left half or a right half of a receiving surface of a pixel, each of R, G, and B signals of the first pixel group and the second pixel group has a value smaller than each of R, G, and B signals of the third pixel group. Thus, it is preferable that the split image processing section 32 corrects brightness of the split image so that the split image has the same brightness as that of an image created from the third pixel group.

In addition, for each time RAW data for one screen is acquired by the imaging element 20, the normal processing section 30 and the split image processing section 32, described above, apply image processing to the RAW data in parallel.

The display graphic controller 36 creates image data for display on the basis of recording image data corresponding to the third pixel group, supplied from the normal processing section 30, and image data on the split image corresponding to the first and second pixel groups, supplied from the split image processing section 32.

That is, the display graphic controller 36 resizes the first display image, the second display image 60, and the third display image 61 depending on a screen size (vertical and horizontal pixel numbers) of the display 213, and creates image data for display by combining the split image with a part of an image (display image) after resizing a recording image.

The image data in which the split image is combined is outputted to the display 213. Accordingly, the display 213 displays a live view image in which the first display image and the second display image, and/or the third display image are combined, the live view image showing a subject image.

In a case where a moving picture mode is selected as a photographing mode by using the dial 212, recording image data (moving image data) created by the normal processing section 30 is recorded in the recording section 40 via the encoder 34, and in a case where a still picture mode is selected as the photographing mode, recording image data (still picture data) created by the normal processing section 30 at the time of shutter release is recorded in the recording section 40 via the encoder 34.

(Hybrid Finder)

In FIG. 11, a hybrid finder 220 provided in the camera body 200 is used as an optical view finder (OVF) 240 or an electronic view finder (EVF) 248. The OVF 240 is a reversed Galilean finder including an objective lens 244 and an eyepiece 246. The EVF 248 includes a liquid crystal display device (LCD) 247, a prism (combining section) 245, and an eyepiece 246.

In front of the objective lens 244, a liquid crystal shutter 243 is provided. The liquid crystal shutter 243 blocks an optical image from reaching the objective lens 244 when the hybrid finder 220 is used as the EVF.

The prism 245 guides an electronic image or a variety of pieces of information, to be displayed in the LCD 247, to the eyepiece 246 by reflecting them, as well as combines an optical image and the information (electronic image and a variety of pieces of information) to be displayed in the LCD 247.

Here, if the finder change lever 214 is turned in the arrow direction SW, an OVF mode in which an optical image is visible through the OVF, and an EVF mode in which an electronic image is visible through the EVF, are alternately selected for each time the finder change lever 214 is turned.

In a case of the OVF mode, the display graphic controller 36 controls the liquid crystal shutter 243 so as to become a non-light-shielding state to allow an optical image to be visible from the eyepiece section, and controls the LCD 247 to display only the split image. Accordingly, it is possible to display a finder image in which the split image is superimposed on a part of the optical image.

On the other hand, in a case of the EVF mode, the display graphic controller 36 controls the liquid crystal shutter 243 so as to become a light-shielding state to allow only an electronic image displayed in the LCD 247 to be visible from the eyepiece section. In addition, image data equivalent to image data in which the split image is combined to be outputted to the display 213 is supplied to the LCD 247. Accordingly, as with the display 213, it is possible to allow the LCD 247 to display an electronic image in which the split image is combined with a part of a normal image.

(First Embodiment)

Figure 12:
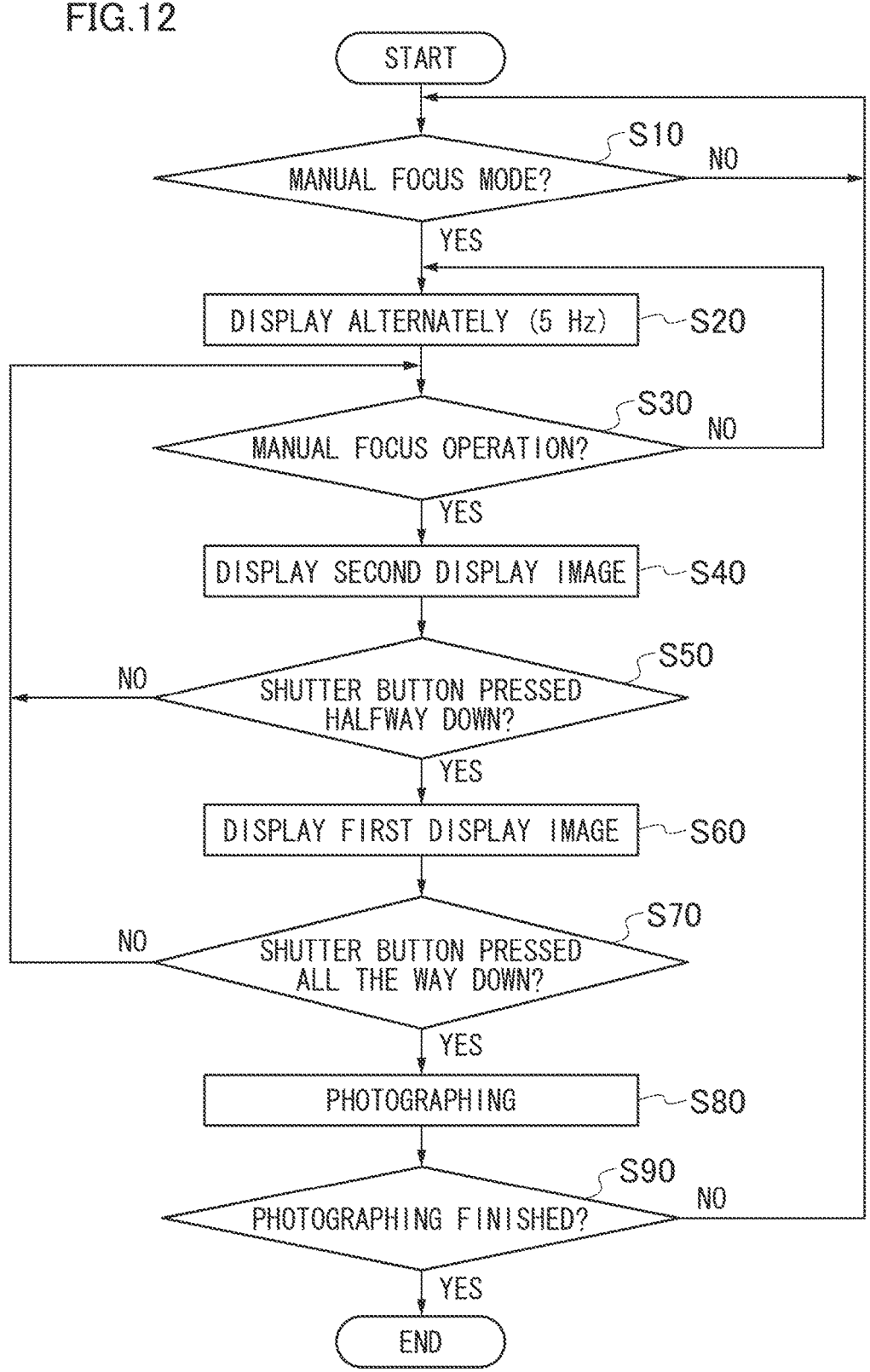
FIG. 12 is a flow chart of a first embodiment of the present invention.

FIG. 12 is a flow chart that describes the first embodiment. Hereinafter, the flow chart will be described.

First, the CPU 12 determines whether the imaging device 100 is in the manual focus mode or not (step S10). If the dial 212 in the operation section 14 is set at the manual focus mode, the CPU 12 can determine that the imaging device 100 is in the manual focus mode. If the imaging device 100 is not in the manual focus mode (No at step S10), processing returns to determine whether the imaging device 100 is in the manual focus mode again.

On the other hand, if the imaging device 100 is in the manual focus mode (Yes at step S10), the second display image 60 and the third display image 61 are alternately displayed at a frequency of 5 Hz (step S20).

After that, the CPU 12 determines whether the imaging device 100 is during manual focus operation or not (step S30). Here, various criteria may be provided for determination during the manual focus operation. For example, the criteria of during manual focus operation may include the following: when the focus ring 302 is moved; when the focus lens is moved; and when a user touches the focus ring 302 with one's hand. In this case, the focus ring 302 is included in the operation section 14, and a signal from the operation section 14 is transmitted to the CPU 12 so that the CPU 12 determines whether the imaging device 100 is during the manual focus operation or not.

Then, it is determined whether the imaging device 100 is during the manual focus operation or not (step S30). If it is determined that the imaging device 100 is not during the manual focus operation (No at step S30), the processing returns to step S20 to alternately display the second display image 60 and the third display image 61 at the frequency of 5 Hz by control of the display graphic controller 36. On the other hand, if it is determined that the imaging device 100 is during the manual focus operation (Yes at step S30), the second display image 60 (split image) is displayed by control of the display graphic controller 36 (step S40).

After that, the CPU 12 determines whether the shutter button 211 is pressed halfway down (step S50). The shutter button 211 is included in the operation section 14, and the CPU 12 determines whether the shutter button 211 is pressed halfway down.

If the shutter button 211 is not pressed halfway down (No at step S50), the processing returns to step S30 to determine whether the imaging device 100 is during the manual focus operation (step S30).

On the other hand, if the shutter button 211 is pressed halfway down (Yes at step S50), only the first display image is displayed in the display 213 by control of the display graphic controller 36 (step S60).

After that, it is determined whether the shutter button 211 is pressed all the way down or not (step S70). The shutter button 211 is included in the operation section 14, and the CPU 12 determines whether the shutter button 211 is pressed all the way down.

If it is determined that the shutter button 211 is not pressed all the way down (No at step S70), the processing returns to step S30 to determine whether the imaging device 100 is during the manual focus operation (step S30).

It is determined whether the shutter button 211 is pressed all the way down or not (step S70), and if it is determined that the shutter button 211 is pressed all the way down (Yes at step S70), photographing is performed (step S80).

After that, it is determined whether the photographing is finished or not (step S90), and if the photographing is not finished (No at step S90), the processing returns to step S10 to determine whether the imaging device 100 is in the manual focus mode or not (step S10). If the photographing is finished (Yes at step S90), the processing is ended. Although the CPU 12 determines whether the photographing is ended, determination may be conducted by using various criteria. For example, the photographing is ended if a power source of the camera body 200 is turned off.

Use of the first embodiment shown in FIG. 12 as described above allows the second display image 60 and the third display image 61 to be alternately displayed in the manual focus mode, so that it is easy to find out where is focused on. In addition, during manual focus operation, display of the second display image 60 facilitates focusing. Further, display of the first display image in a state where the shutter button 211 is pressed halfway down allows an image to be photographed to be accurately grasped.

(Second Embodiment)

Figure 13:
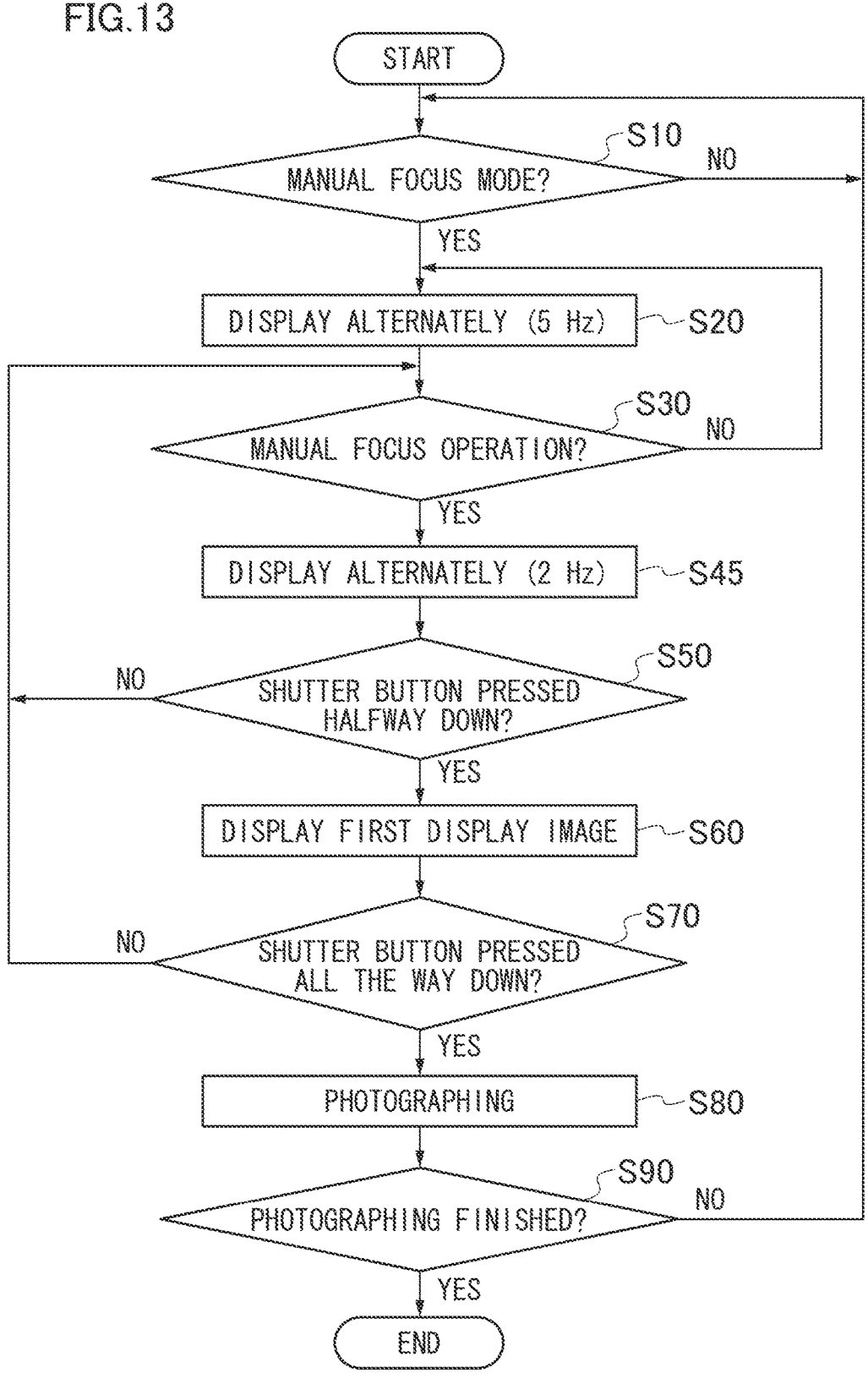
FIG. 13 is a flow chart of a second embodiment of the present invention.

FIG. 13 is a flow chart that describes the second embodiment. Hereinafter, the flow chart will be described. A step equivalent to that of FIG. 12 is designated by the same reference numeral as that of FIG. 12 without duplicated description on the step.

Comparing the flow chart of the first embodiment shown in FIG. 12 and the flow chart of the second embodiment shown in FIG. 13, the flow chart of the second embodiment shown in FIG. 13 is different from that in FIG. 12 in that if it is determined that the manual focus operation is performed (in a case where determinations at step S30 is Yes), the second display image 60 and the third display image 61 are alternately displayed at a frequency of 2 Hz by control of the display graphic controller 36 (step S45).

That is, the second embodiment shown in FIG. 13 allows the second display image 60 and the third display image 61 to be alternately displayed at 5 Hz (step S20) in a case of the manual focus mode, as well as allows the second display image 60 and the third display image 61 to be alternately displayed at 2 Hz during the manual focus operation.

Use of the second embodiment shown in FIG. 13 as described above allows the second display image 60 and the third display image 61 to be alternately displayed at 2 Hz even during the manual focus operation. Thus, a user can perform the focus operation while easily determining whether an image is in focus or not.

(Third Embodiment)

Figure 14:
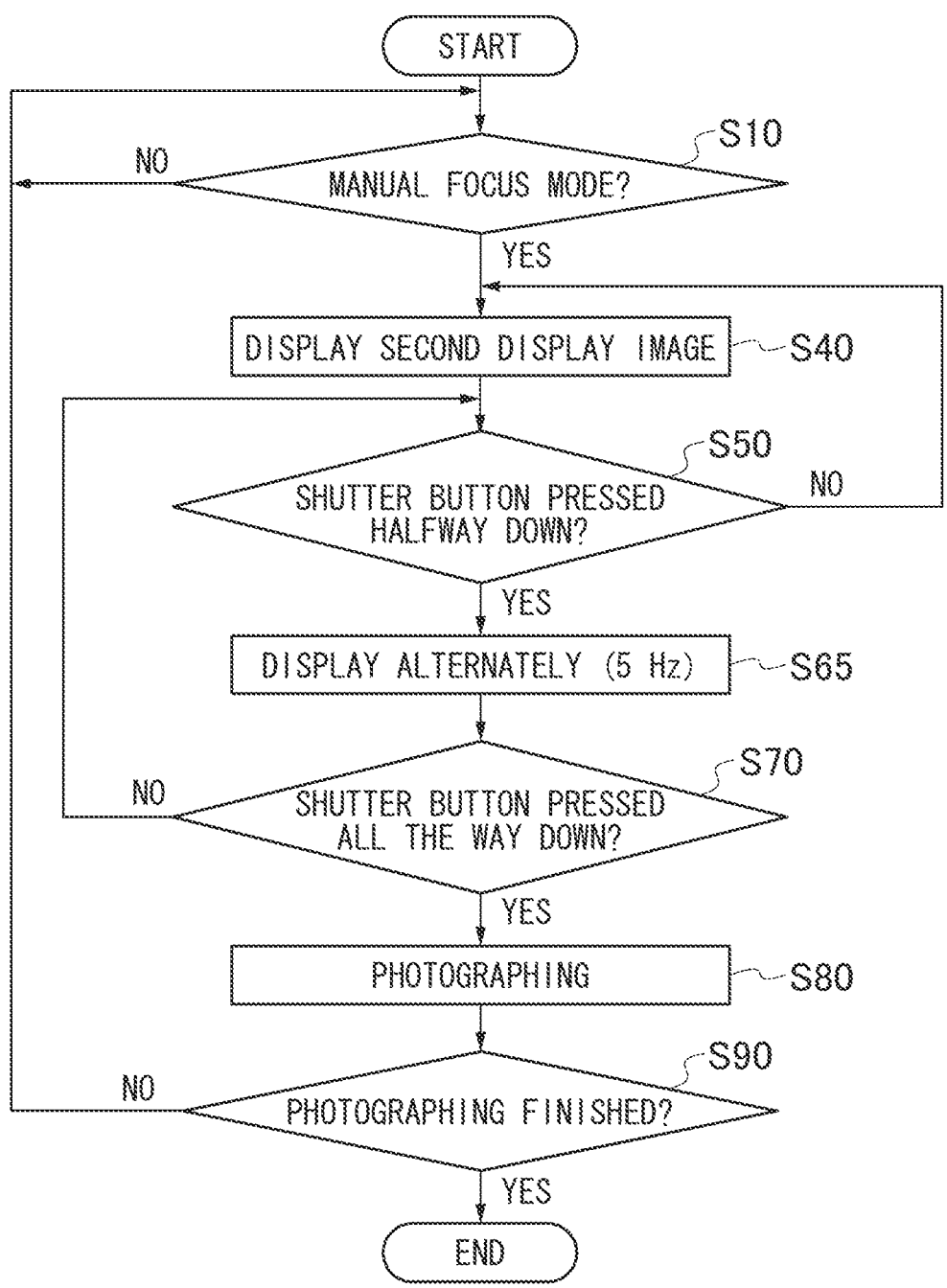
FIG. 14 is a flow chart of a third embodiment of the present invention.

FIG. 14 is a flow chart that describes the third embodiment. Hereinafter, the flow chart will be described. A step equivalent to that of FIG. 12 is designated by the same reference numeral as that of FIG. 12 without duplicated description on the step.

First, in the third Embodiment, it is determined whether the imaging device 100 is in the manual focus mode or not (step S10). If the imaging device 100 is not in the manual focus mode (No at step S10), processing returns to the start. On the other hand, if the imaging device 100 is in the manual focus mode (Yes at step S10), the second display image is displayed (step S40).

After that, it is determined whether the shutter button 211 is pressed halfway down or not (step S50). If the shutter button 211 is not pressed halfway down (No at step S50), the processing returns to step S40 to display the second display image 60 (step S40). On the other hand, if the shutter button 211 is pressed halfway down (Yes at step S50), the second display image 60 and the third display image 61 are alternately displayed at a frequency of 5 Hz (step S65).

After that, it is determined whether the shutter button 211 is pressed all the way down or not (step S70). If the shutter button 211 is pressed all the way down (No at step S70), the processing returns to step S50 to determine whether the shutter button 211 is pressed halfway down or not (step S50). On the other hand, if the shutter button 211 is pressed all the way down (Yes at step S70), photographing is performed (step S80).

After that, it is determined whether the photographing is finished or not (step S90), and if the photographing is not finished (No at step S90), the processing returns to step S10 to determine whether the imaging device 100 is in the manual focus mode or not (step S10). On the other hand, if it is determined that the photographing is finished (Yes at step S90), the processing is ended.

If it is determined that the imaging device 100 is in the manual focus mode (step S10), the display graphic controller 36 controls the display 213 to display the second display image 60 (step S40). After that, the CPU 12 determines whether the shutter button 211 is pressed halfway down or not (step S50).

Since alternate display (5 Hz) of the second display image 60 and the third display image 61 is performed when the shutter button 211 is pressed halfway down (Yes at step S50) as described in the third embodiment, it is possible to easily determine whether an image to be photographed is in focus or not.

(Fourth Embodiment)

Figure 15:
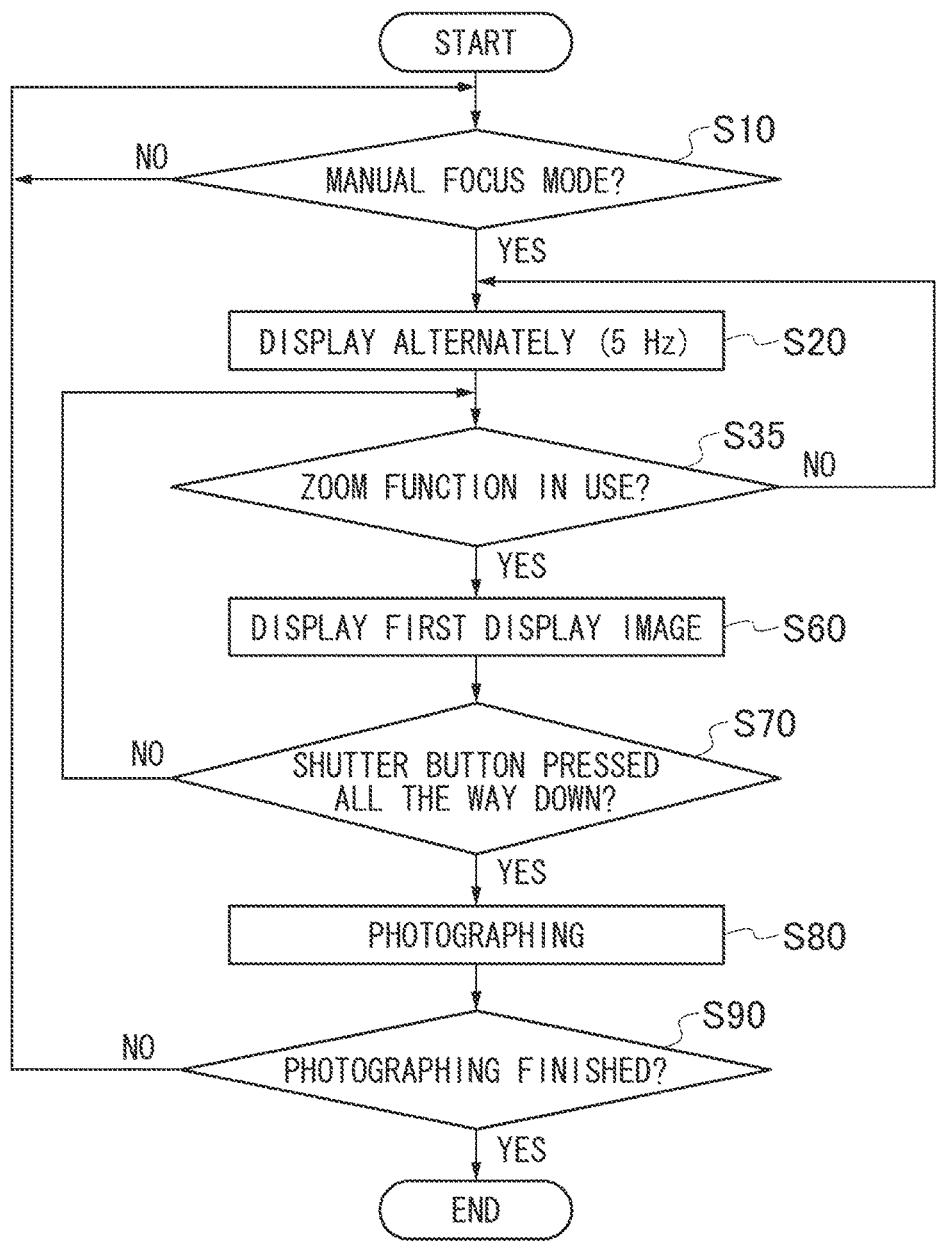
FIG. 15 is a flow chart of a fourth embodiment of the present invention.

FIG. 15 is a flow chart that describes the fourth embodiment. Hereinafter, the flow chart will be described. A step equivalent to that of FIG. 12 is designated by the same reference numeral as that of FIG. 12 without duplicated description on the step.

Comparing the fourth embodiment shown in FIG. 15 and the third embodiment shown in FIG. 14, while the second display image is displayed in the third embodiment shown in FIG. 14 (step S40), the second display image 60 and the third display image are alternately displayed at a frequency of 5 Hz in the fourth embodiment shown in FIG. 15 (step S20). In addition, while it is determined whether the shutter button 211 is pressed halfway down or not (step S50) in the third Embodiment shown in FIG. 14, it is determined whether a zoom function is in use or not in the fourth embodiment shown in FIG. 15 (step S35). Further, while the second display image 60 and the third display image 61 are alternately displayed in the third embodiment shown in FIG. 14 (step S65), it is determined whether the shutter button 211 is pressed all the way down or not in the fourth embodiment shown in FIG. 15 (step S70).

The CPU 12 determines whether the zoom function is in use or not (step S35). Various criteria are applicable to determination of whether the zoom function is in use. The CPU 12 may determine that the zoom function is in use through the operation section 14 by using criteria such as when a zoom ring is moved, when a zoom lens is moved, and when a display image is zoomed.

As described in the fourth embodiment, if the zoom function is in use (Yes at step S35), the first display image is displayed (step S70) so that it is possible to accurately grasp an image that is zoomed.

(Fifth Embodiment)

Figure 16:
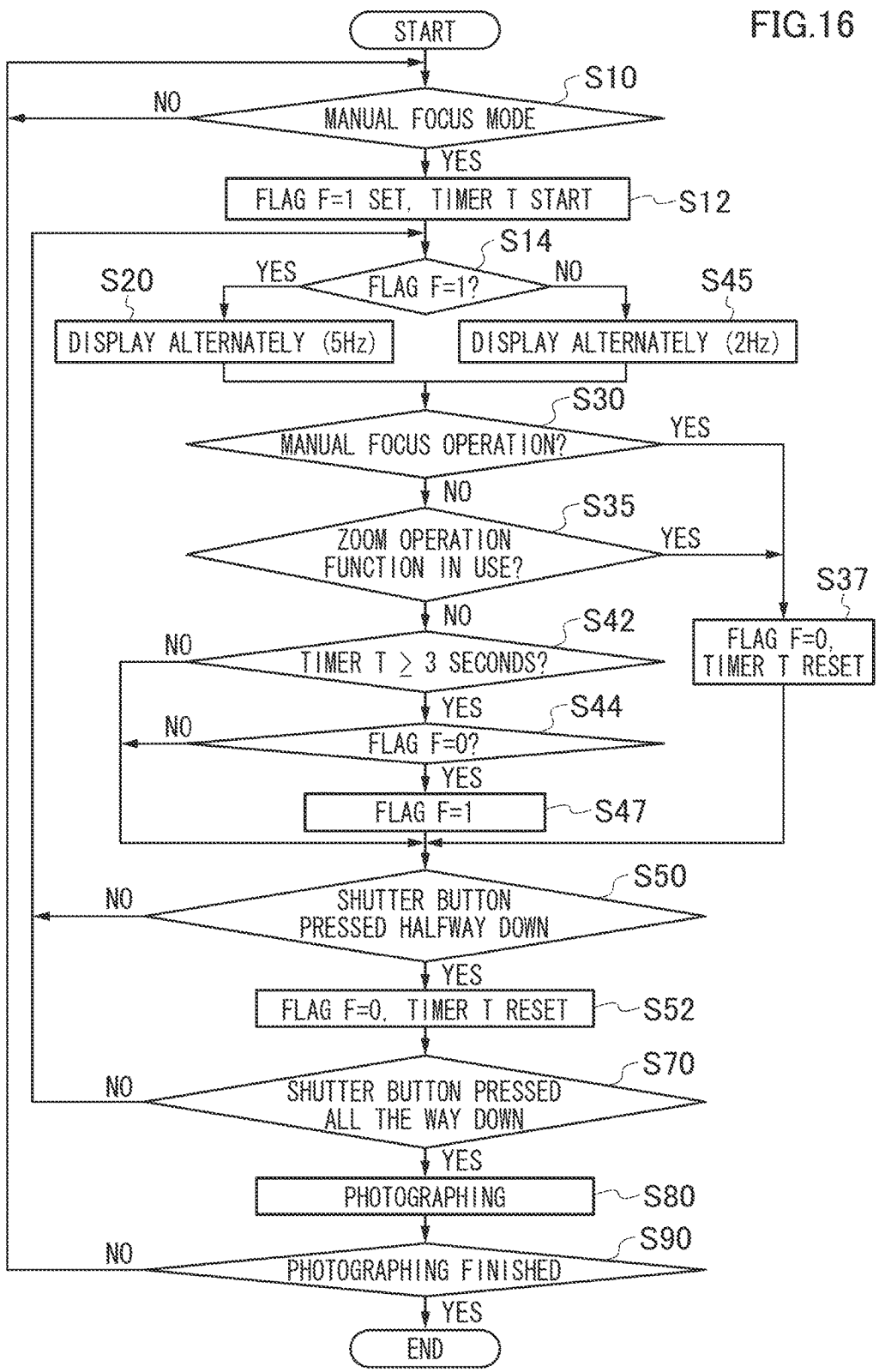
FIG. 16 is a flow chart of a fifth embodiment of the present invention.

FIG. 16 is a flow chart that describes the fifth embodiment. The fifth embodiment is an example in which if there is no operation for a prescribed period, display returns to the start. That is, the second display image 60 and the third display image 61 are alternately displayed at a frequency of 5 Hz from the start of the manual focus mode until when manual focus operation and zoom operation are performed, and the shutter button 211 is pressed halfway down. When the manual focus operation and the zoom operation are performed, or the shutter button 211 is pressed halfway down, the second display image 60 and the third display image 61 are alternately displayed at a frequency of 2 Hz. In addition, after that, if the manual focus operation and the zoom operation are not performed, or the shutter button 211 is not pressed halfway down, for a prescribed time, the second display image 60 and the third display image 61 are alternately displayed at the frequency of 5 Hz again. Hereinafter, the flow chart of FIG. 16 will be described. A step equivalent to that of FIG. 12 is designated by the same reference numeral as that of FIG. 12.

First, it is determined whether the imaging device 100 is in the manual focus mode or not (step S10). If the imaging device 100 is not in the manual focus mode (No at step S10), processing returns to the start. On the other hand, if the imaging device 100 is in the manual focus mode (Yes at step S10), the CPU 12 sets a flag F=1 to the display graphic controller 36 as well as allows a timer T of the display graphic controller 36 to start counting (step S12).

After that, it is determined whether the CPU 12 sets the flag F=1 to the display graphic controller 36 or not (step S14). If the flag F=1 is set (Yes at step S14), the second display image 60 and the third display image 61 are alternately displayed at a frequency of 5 Hz (step S20). On the other hand, the flag F=1 is not set (No at step S14), the second display image 60 and the third display image 61 are alternately displayed at a frequency of 2 Hz (step S45).

Then, it is determined whether the imaging device 100 is during the manual focus operation or not (step S30). If the imaging device 100 is during the manual focus operation (Yes at step S30), the CPU 12 sets a flag F=0 to the display graphic controller 36 as well as resets the timer T (step S37). On the other hand, if the imaging device 100 is not during the manual focus operation (No at step S30), it is determined whether the zoom function is in use or not (step S35). If the zoom function is in use (Yes at step S35), the flag F=0 is set as well as the timer T is reset (step S37). On the other hand, if the zoom function is not in use (No at step S35), the CPU 12 determines whether three or more seconds elapse in the timer T or not (step S42). The timer T can be appropriately set to the number of seconds, such as one second, five seconds, and seven seconds. If three or more seconds do not elapse in the timer T (No at step S42), then the processing advances to determination of whether the shutter button 211 is pressed halfway down or not (step S50).

If three or more seconds elapse in the timer T (Yes at step S42), the CPU 12 determines whether the flag F=0 is set or not (step S44). If the flag F=0 is not set (No at step S44), then the processing advances to the determination of whether the shutter button 211 is pressed halfway down or not (step S50). On the other hand, if the flag F=0 is set (Yes at step S44), the CPU 12 sets the flag F=1 to the display graphic controller 36 (step S47).

In the determination of whether the shutter button 211 is pressed halfway down or not (step S50), if the shutter button 211 is not pressed halfway down (No at step S50), the processing returns to step S14 to determine whether the flag F=1 is set (step S14). On the other hand, if the shutter button 211 is pressed halfway down (Yes at step S50), the flag F=0 is set and the timer T is reset to zero (step S52).

After that, it is determined whether the shutter button 211 is pressed all the way down or not (step S70). If the shutter button 211 is not pressed all the way down (No at step S70), the processing returns to step S14 to determine whether the flag F=1 is set (step S14). On the other hand, if the shutter button 211 is pressed all the way down (Yes at step S70), the processing advances to photographing (step S80).

After that, it is determined whether the photographing is finished (step S90). If the photographing is not finished (No at S90), the processing returns to determine whether the imaging device 100 is in the manual focus mode or not (step S10), and if the photographing is finished (Yes at step S90), the processing is ended.

As described above, use of the fifth embodiment shown in FIG. 16 enables display to return to an initial display state again if operation is not performed for a prescribed time. Accordingly, it is possible to perform image display suitable for a usage mode of the imaging device 100 to facilitate checking of whether an image is in focus.

(Another Embodiment of Imaging Element)

Figure 17:
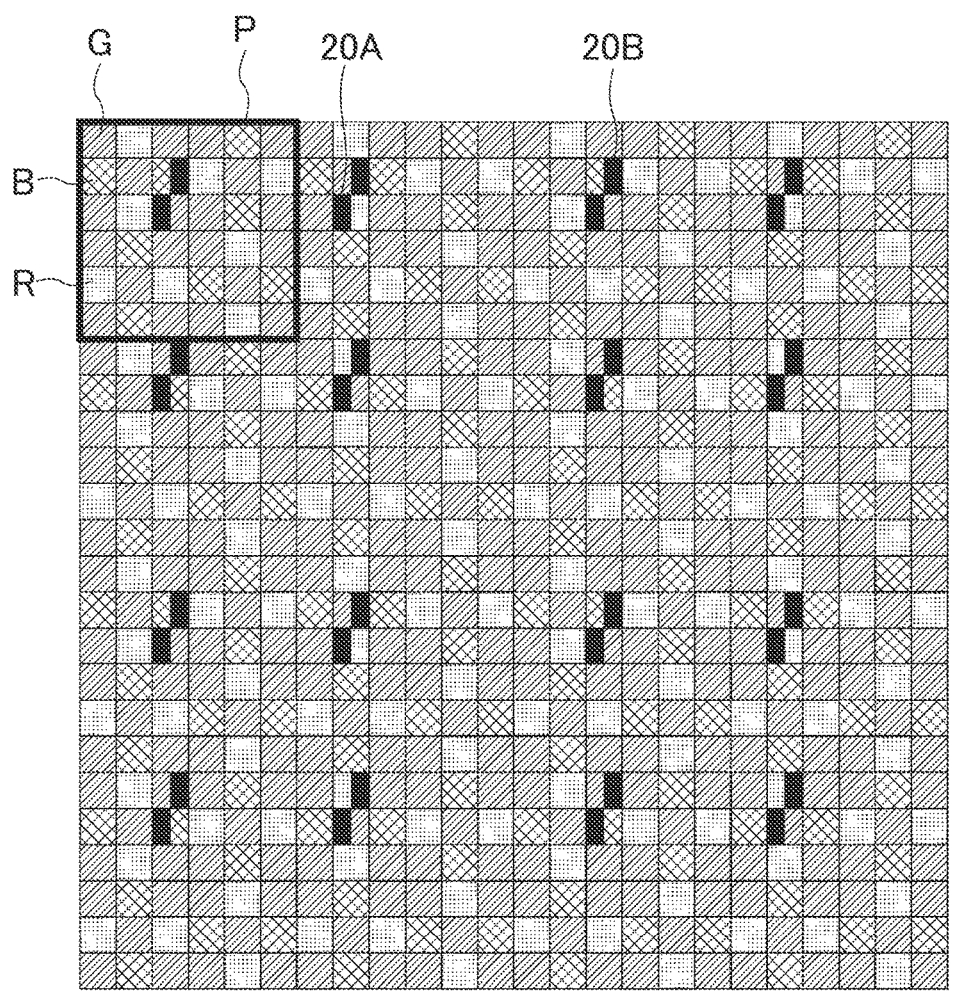
FIG. 17 shows a color filter array of other color filters and light-shielding members provided in an imaging element used in the imaging device of the present invention.

FIG. 17 shows another embodiment of the imaging element 20 applied to the present invention, and particularly shows a color filter array and a light-shielding member of color filters provided in the imaging element 20.

The color filter array of the imaging element 20 shown in FIG. 17 includes a basic array pattern P (a pattern shown in a thick-bordered box) composed of a square array pattern corresponding to 6×6 pixels, the basic array pattern P being repeatedly arranged horizontally and vertically. That is, the color filter array includes filters of each of colors of R, G, and B that are arranged in a predetermined cycle. In FIG. 17, R, G, and B designate a red color filter, a green color filter, and a blue color filter, respectively. In addition, each of reference numerals 20A and 20B designates a light-shielding member, and a pixel group is indicated as follows: a first pixel group that includes the light-shielding member 20A; a second pixel group that includes the light-shielding member 20B; and a third pixel group that does not include the light-shielding members.

If only right and left phase pixel groups (the first pixel group and the second pixel group) included in the imaging element 20 shown in FIG. 17 are extracted, a color filter array of each of right and left phase pixel groups forms a Bayer array. That is, some pixels of all pixel groups of the imaging element 20 are arranged as a phase pixel so that a color filter array of each of the right and left phase difference pixel groups forms the Bayer array.

The color filter array of the imaging element 20 shown in FIG. 17 includes the basic array pattern P composed of 6×6 pixels to increase in complexity as compared with the Bayer array including a basic array pattern composed of 2×2 pixels. Accordingly, although signal processing such as demosaic (synchronization) processing increases in complexity, phase difference pixels are arranged so that the color filter array of each of the right and left phase pixel groups forms the Bayer array, as described above. As a result, it is possible to easily perform the signal processing such as the demosaic (synchronization) processing for creating a split image.

(Configuration of Smartphone)

Figure 18:
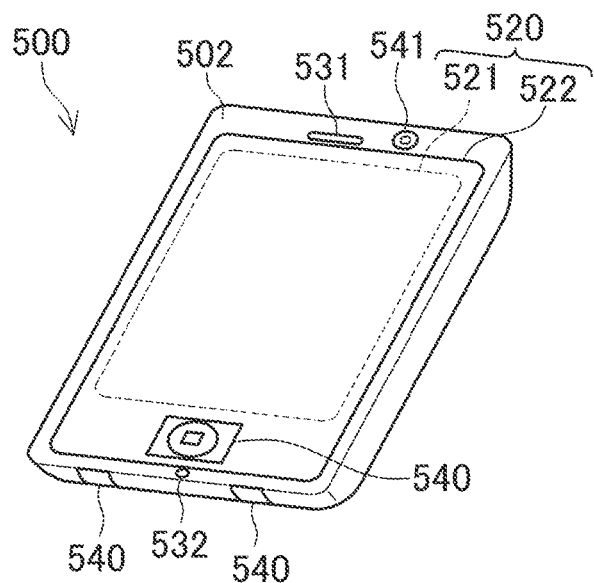
FIG. 18 is an external view of a smartphone as an imaging device in accordance with another aspect of the present invention.
Figure 19:
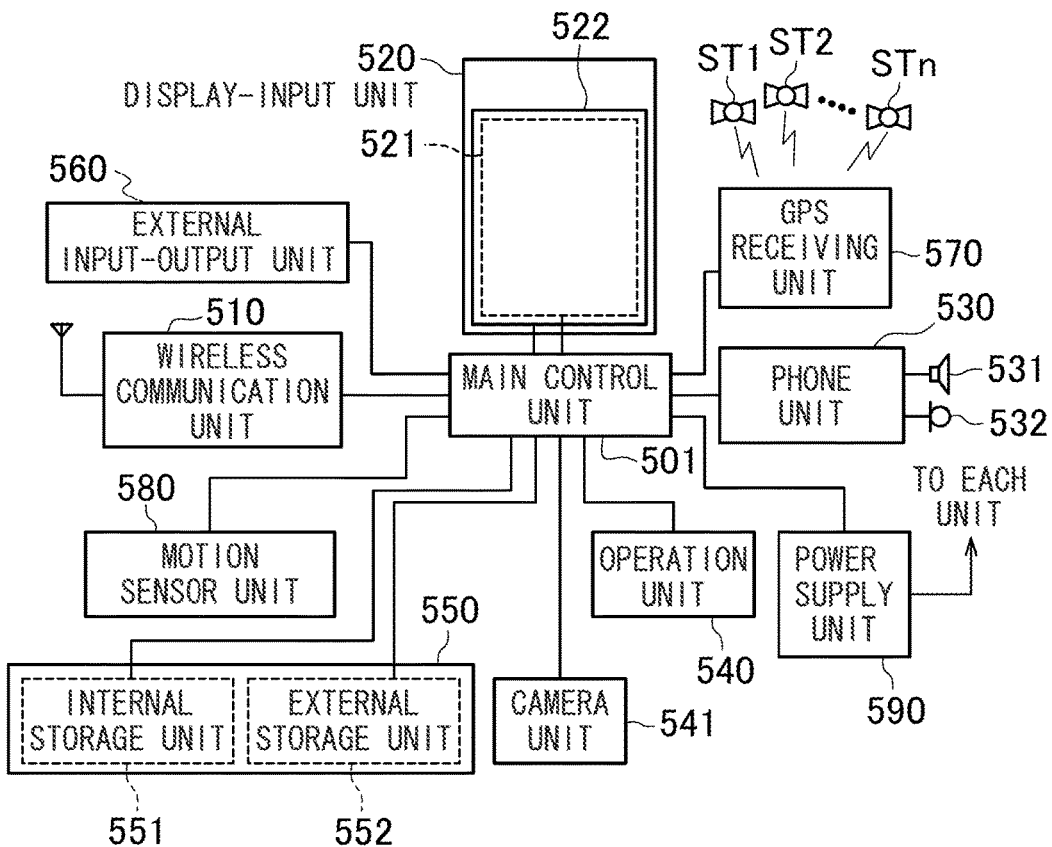
FIG. 19 is a block diagram showing a configuration of a main section of the smartphone.

FIG. 18 shows appearance of a smartphone 500 of another embodiment of the imaging device 100. The smartphone 500 shown in FIG. 18 has a tabular body 502 that is provided in its one face with a display-input unit 520 into which a display panel 521 serving as the display 213 and an operation panel 522 serving as an input section are integrated. In addition, the body 502 includes a speaker 531, a microphone 532, an operation unit 540, and a camera unit 541. A configuration of the body 502 is not limited to the above. For example, it is also possible to apply a configuration in which the display 213 and an input section are separated, the body 502 with a foldable structure, and a configuration having a slide mechanism, FIG. 19 is a block diagram showing a configuration of the smartphone 500 shown in FIG. 18. As shown in FIG. 19, the smartphone includes the following as main components: a wireless communication unit 510; a display-input unit 520; a phone unit 530; an operation unit 540; a camera unit 541; a storage unit 550; an external input-output unit 560; a global positioning system (GPS) receiving unit 570; a motion sensor unit 580; a power supply unit 590; and a main control unit 501. In addition, the smartphone 500 has a wireless communication function of performing mobile wireless communication through a base station device BS and a mobile communication network NW, as a main function.

The wireless communication unit 510 performs wireless communication with respect to the base station device BS installed in the mobile communication network NW in accordance with an instruction of the main control unit 501. The wireless communication is used to transmit and receive various file data items such as voice data and image data, electronic mail data, and the like, and is used to receive Web data, streaming data, and the like.

The display-input unit 520 is so-called a touch panel that displays an image (a still image and a dynamic image), character information, and the like, by control of the main control unit 501 to visually communicate information to a user, as well as detects a user operation with respect to the displayed information, and the display-input unit 520 includes the display panel 521 and the operation panel 522. In a case of viewing a 3D image generated, it is preferable that the display panel 521 is a 3D display panel.

The display panel 521 uses a liquid crystal display (LCD), an organic electro-luminescence display (OLED), and the like, as a display device. The operation panel 522 is mounted so that an image displayed in a screen of the display panel 521 is visible, and is a device that detects one or more coordinates by an operation with a finger of a user and a stylus. When the device is operated with a finger of a user and a stylus, a detection signal caused by the operation is outputted to the main control unit 501. The main control unit 501 then detects an operation position (coordinate) on the display panel 521 on the basis of the received detection signal.

As shown in FIG. 18, the display panel 521 and the operation panel 522 of the smartphone 500 are integrated to constitute the display-input unit 520 in which the display panel 521 is arranged so as to be completely covered with the operation panel 522. In a case where the arrangement above is applied, the operation panel 522 may include a function of detecting a user operation in an area outside the display panel 521 as well. That is, the operation panel 522 may include a detection area (hereinafter referred to as a display area) for an overlapping portion overlapped with the display panel 521, and a detection area (hereinafter referred to as a non-display area) for an outer periphery other than the display area, which does not overlap with the display panel 521.

A size of the display area may completely coincide with a size of the display panel 521, however, it is unnecessary to allow both sizes to coincide with each other. In addition, the operation panel 522 may include two sensitive areas of an outer periphery and an inside area other than the outer periphery. Further, a width of the outer periphery can be appropriately designed depending on a size of the body 502 and the like. Furthermore, a position detection method applicable to the operation panel 522 includes a matrix switch method, a resistive film method, a surface elastic wave method, an infrared ray method, an electromagnetic induction method, and a capacitance method, and any one of the methods is applicable.

The phone unit 530 includes the speaker 531 and the microphone 532, and converts voice of a user received through the microphone 532 into voice data that can be processed in the main control unit 501 to output the voice data to the main control unit 501, as well as decodes voice data received by the wireless communication unit 510 or the external input-output unit 560 to output the voice data from the speaker 531. In addition, as shown in FIG. 18, it is possible to mount the speaker 531 on a face in which the display-input unit 520 is provided, and possible to mount the microphone 532 in a side face of the body 502, for example.

The operation unit 540 is a hardware key using a key switch and the like, and receives an instruction from a user. As shown in FIG. 18, for example, the operation unit 540 is mounted in a lower face below a display portion of the body 502 of the smartphone 500, and is a push button switch that is turned on when pressed with a finger and is turned off by restoring force of a spring and the like when the finger is removed.

The storage unit 550 stores the following: a control program and control data of the main control unit 501; address data in which names of communications partners are correlated with telephone numbers, and the like; data of electronic mails that are transmitted and received; Web data downloaded by Web browsing; and content data that is downloaded, as well as temporarily stores streaming data and the like. The storage unit 550 is composed of an internal storage unit 551 built in the smartphone and an external storage unit 552 having an external memory slot into which an external memory is detachable. Further, each of the internal storage unit 551 and the external storage unit 552, constituting the storage unit 550, is realized by using a storage medium, such as a flash memory type, a hard disk type, a multimedia card micro type, a card type memory (such as a Micro SD (registered trademark) memory), a random access memory (RAM), and a read only memory (ROM).

The external input-output unit 560 serves as an interface with all external apparatuses to be connected to the smartphone 500 so that the smartphone directly or indirectly connects to another external apparatus through communication (such as universal serial bus (USB), and IEEE1394) or a network (such as the Internet, a wireless LAN, Bluetooth (registered trademark)), Radio Frequency Identification (RFID), Infrared Data Association (IrDA: registered trademark), Ultra Wideband (UWB: registered trademark), and ZigBee (registered trademark).

The smartphone 500 is connected to an external apparatus, such as: a wired/wireless headset; a wired/wireless external charger; a wired/wireless data port; a memory card, a Subscriber Identity Module (SIM) Card/, and a User Identity Module (UIM) Card, which are to be connected through the card socket; an external audio/video apparatus to be connected through an audio/video Input/Output (I/O) terminal, an external audio/video apparatus to be connected with wireless connection; a smartphone to be connected with wired/wireless connection; a personal computer to be connected with wired/wireless connection; a personal digital assistant (PDA) to be connected with wired/wireless connection; a personal computer to be connected with wired/wireless connection; and an earphone. The external input-output unit 560 is capable of transmitting data transmitted from an external apparatus such as the above to each of components in the smartphone 500 as well as capable of allowing data in the smartphone 500 to be transmitted to an external apparatus.

The GPS receiving unit 570 receives GPS signals transmitted from GPS satellites ST1 to STn in accordance with an instruction of the main control unit 501 to perform positioning calculation processing based on the received GPS signals, thereby detecting a position of the smartphone 500, defined by a latitude, a longitude, and an altitude. In a case where location information can be acquired from the wireless communication unit 510 and the external input-output unit 560 (such as a wireless local area network (LAN)), the GPS receiving unit 570 is also capable of detecting a position of the smartphone 500 by using the location information.

The motion sensor unit 580 includes a triaxial acceleration sensor and the like, for example, to detect a physical motion of the smartphone 500 in accordance with an instruction of the main control unit 501. The physical motion of the smartphone 500 is detected so that a direction and acceleration of the motion of the smartphone 500 are detected. The detection result above is to be outputted to the main control unit 501.

The power supply unit 590 supplies electric power stored in a battery (not shown) to each of units of the smartphone 500 in accordance with an instruction of the main control unit 501.

The main control unit 501 includes a microprocessor and operates in accordance with a control program and control data stored in the storage unit 550 to perform centralized control of each of units of the smartphone 500. In addition, the main control unit 501 has a mobile communication control function of controlling each of units of a communication system and an application processing function in order to perform voice communication and data communication through the wireless communication unit 510.

The application processing function is realized by allowing the main control unit 501 to operate in accordance with application software stored in the storage unit 550. The application processing function includes an infrared ray communication function of performing data communication with a counterpart device by controlling the external input-output unit 560, an electronic mail function of performing transmission and reception of an electronic mail, a Web browsing function of browsing a Webpage, a function of creating a 3D image from a 2D image in accordance with the present invention, and the like, for example.

In addition, the main control unit 501 includes an image processing function of displaying a video in the display-input unit 520 on the basis of image data (data of a still image and a dynamic image) such as received data and downloaded streaming data, and the like. The image processing function is a function in which the main control unit 501 decodes the image data above and applies image processing to the decoded result to allow the display-input unit 520 to display an image.

Further, the main control unit 501 performs display control with respect to the display panel 521, and performs operation detection control of detecting a user operation through the operation unit 540 and the operation panel 522.

The display control is performed, so that the main control unit 501 allows a software key such as an icon for starting up application software and a scroll bar to be displayed, or allows a window for creating an electronic mail to be displayed. The scroll bar serves as a software key of receiving an instruction of moving a displaying portion of an image that is too large to fit in a display area of the display panel 521, and the like.

In addition, the operation detection control is performed to allow the main control unit 501 to do as follows: detecting a user operation through the operation unit 540; receiving an operation with respect to the icon described above and input of a character string into an input section of the window described above, through the operation panel 522; and receiving a request for scrolling a display image through the scroll bar.

Further, the operation detection control is performed to allow the main control unit 501 to have a touch panel control function of controlling a sensitive area of the operation panel 522 and a display position of a software key by determining whether an operation position with respect to the operation panel 522 is an overlapping portion (display area) overlapped with the display panel 521 or an outer periphery (non-display area) other than the overlapping portion, which outer periphery does not overlap with the display panel 521.

The main control unit 501 is also capable of detecting a gesture operation with respect to the operation panel 522 to allow a predetermined function to be performed in accordance with the detected gesture operation. The gesture operation is not a conventional simple touch operation, but an operation such as drawing a trail with a finger, designating a plurality of positions at the same time, and drawing a trail for at least one of the plurality of positions in combination with both of the operations above.

The camera unit 541 is a digital camera for electronic photographing by using an imaging element 20 such as a complementary metal oxide semiconductor (CMOS), and a charge-coupled device (CCD), and is provided with a function equivalent to that provided in the imaging device 100 shown in FIG. 1 and the like.

That is, the camera unit 541 is configured so that the manual focus mode and the autofocus mode are selectable. If the manual focus mode is selected, it is possible to adjust the focus of a photographic lens of the camera unit 541 by operating the operation unit 540, or an icon button or the like for focusing displayed in the display-input unit 520. When the manual focus mode is selected, the display panel 521 displays a live view image in which a split image is combined so that a focusing state at the time of manual focusing can be checked. In addition, the hybrid finder 220 shown in FIG. 8 may be provided in the smartphone 500.

Further, the camera unit 541 is controlled by the main control unit 501 to be able to convert image data acquired by photographing into compressed image data such as a joint photographic coding experts group (JPEG) to record the compressed image data in the storage unit 550, and to be able to output the compressed image data through the external input-output unit 560 or the wireless communication unit 510. In the smartphone 500 shown in FIG. 18, the camera unit 541 is mounted on a face in which the display-input unit 520 is mounted, but a mounting position of the camera unit 541 is not limited to the above. The camera unit 541 may be mounted on a back face of the display-input unit 520, or a plurality of camera units 541 may be mounted. In a case where a plurality of camera units 541 is mounted, it is possible to perform photographing with a single camera unit 541 selected to be used for the photographing, as well as with using the plurality of camera units 541 at the same time.

In addition, the camera unit 541 is available to various functions of the smartphone 500. For example, it is possible to display an image acquired by the camera unit 541 in the display panel 521, as well as to use an image acquired by the camera unit 541 as one of operation inputs of the operation panel 522. When the GPS receiving unit 570 detects a position, it is also possible to detect the position by referring to an image received from the camera unit 541. Further, it is possible to determine an optical axis direction of the camera unit 541 of the smartphone 500 by referring to an image received from the camera unit 541, without using a triaxial acceleration sensor or together with using the triaxial acceleration sensor, as well as to determine present use environment. It is certainly possible to use an image received from the camera unit 541 in application software.

Other than the above, it is possible to record image data of a still image or a moving image in the storage unit 550 by adding information, such as location information acquired by the GPS receiving unit 570, voice information acquired by the microphone 532 (text information acquired by performing speech-to-text conversion with a main control unit and the like is available), and posture information acquired by the motion sensor unit 580, as well as possible to output the image data through the external input-output unit 560 and the wireless communication unit 510.

The present invention is not limited to the embodiments described above, and therefore, it is needless to say that a variety of modifications are possible within a range without departing from the spirit of the present invention.

What is claimed is:

1. An imaging device comprising:
a creation device configured to create a first display image on the basis of an image signal outputted from an imaging element provided with first and second pixel groups in which subject images that have passed through first and second regions of a photographic lens are imaged, respectively, after pupil-split has been applied to the subject images, as well as to create a second display image to be used for focusing confirmation and a third display image to be used for assisting the focusing confirmation from first and second images based on first and second image signals outputted from the first and second pixel groups;
a display device capable of alternately displaying the second display image and the third display image; and
a display control unit configured to control alternate display of the second display image and the third display image in the display device, and configured to control the display device so as to display the first display image and the second display image, or the first display image and the third display image,
wherein the creation device creates the second display image including first and second display ranges in which the first image is used in the first display range and the second image is used in the second display range, and wherein the creation device creates the third display image in which an image used in at least one of the first and second display ranges is different from the second display image.

2. The imaging device according to claim 1, wherein the imaging element includes a third pixel group in which the subject image to which the pupil-split is not applied is imaged, and wherein the creation device creates the first display image on the basis of a third image signal outputted from the third pixel group.

3. The imaging device according to claim 1, wherein the imaging element includes first and second pixel groups in at least a central portion of the imaging element.

4. The imaging device according to claim 1, wherein the display control device switches between control in a first mode and control in a second mode, the first mode performing display in which an image composed of the first display image and the second display image, and an image composed of the first display image and the third display image, are alternately displayed, and the second mode performing display in which only an image composed of the first display image and the second display image is displayed instead of the alternate display.

5. The imaging device according to claim 1, wherein the display control device switches between control in a first mode and control in a second mode, the first mode performing display in which an image composed of the first display image and the second display image, and an image composed of the first display image and the third display image, are alternately displayed at a first frequency, and the second mode performing display in which the image composed of the first display image and the second display image, and the image composed of the first display image and the third display image, are alternately displayed at a second frequency higher than the first frequency.

6. The imaging device according to claim 1, wherein the display control unit switches between control in a first mode and control in a second mode, the first mode performing display in which an image composed of the first display image and the second display image, and an image composed of the first display image and the third display image are alternately displayed, and the second mode performing display in which only the first display image is displayed.

7. An imaging device comprising:
a creation device configured to create a second display image to be used for focusing confirmation and a third display image to be used for assisting the focusing confirmation from first and second images based on first and second image signals outputted from first and second pixel groups on the basis of image signals outputted from an imaging element provided with the first and second pixel groups in which subject 30 images that have passed through first and second regions of a photographic lens are imaged, respectively, after pupil-split has been applied to the subject images;
a display device capable of alternately displaying the second display image and the third display image; and
a display control device configured to control alternate display of the second display image and the third display image in the display device, and configured to control the display device so as to display the second display image or the third display image,
wherein the creation device creates the second display image including first and second display ranges in which the first image is used in the first display range and the second image is used in the second display range, and wherein the creation device creates the third display image in which an image used in at least one of the first and second display ranges is different from the second display image.

8. The imaging device according to claim 7, wherein the display control device switches between control in a first mode and control in a second mode, the first mode performing display in which the second display image and the third display image are alternately displayed, and the second mode performing display in which only the second display image is displayed instead of the alternate display.

9. The imaging device according to claim 7, wherein the display control device switches between control in a first mode and control in a second mode, the first mode performing display in which the second display image and third display image are alternately displayed at a first frequency, and the second mode performing display in which the second display image and the third display image are alternately displayed at a second frequency higher than the first frequency.

10. The imaging device according to claim 4, wherein the photographic lens has a manual focus function, and wherein the display control device performs control in the first mode while the manual focus function is used, and performs control in the second mode while the manual focus function is not used.

11. The imaging device according to claim 4, further comprising a shutter device configured to output a photographing preparation command and a photographing command, wherein the display control unit switches to the first mode while the shutter device outputs the photographing preparation command.

12. The imaging device according to claim 4, wherein the photographic lens has a zoom function, and wherein the display control unit performs control in the first mode while the zoom function is used and performs control in the second mode while the zoom function is not used.

13. The imaging device according to claim 1, wherein the second display image is a split image, and the third display image is a split image different from an image composed of the first image, an image composed of the second image, and the split image that is the second display image.

14. An image display method comprising the steps of:
creating a first display image on the basis of an image signal outputted from an imaging element provided with first and second pixel groups in which subject images that have passed through first and second regions of a photographic lens are imaged, respectively, after pupil-split has been applied to the subject images, as well as creating a second display image to be used for focusing confirmation and a third display image to be used for assisting the focusing confirmation from first and second images based on first and second image signals outputted from the first and second pixel groups; and
allowing a display device capable of alternately displaying the second display image and the third display image to display the first display image and the second display image, or the first display image and the third display image by controlling alternate display of the second display image and the third display image in the display device,
wherein the step of creating the first display image, the second display image, and the third display image creates the second display image including first and second display ranges in which the first image is used in the first display range and the second image is used in the second display range, and the third display image in which an image used in at least one of the first and second display ranges is different from the second display image.

15. An image display method comprising the steps of;
creating a second display image to be used for focusing confirmation and a third display image to be used for assisting the focusing confirmation from first and second images based on first and second image signals outputted from first and second pixel groups on the basis of image signals outputted from an imaging element provided with the first and second pixel groups in which subject images that have passed through first and second regions of a photographic lens are imaged, respectively, after pupil-split has been applied to the subject images; and
allowing a display device capable of alternately displaying the second display image and the third display image to display the second display image or the third display image by controlling alternate display of the second display image and the third display image in the display device,
wherein the step of creating the second display image and the third display image creates the second display image including first and second display ranges in which the first image is used in the first display range and the second image is used in the second display range, and the third display image in which an image used in at least one of the first and second display ranges is different from the second display image.

* * * * *